United States Patent
Rosendahl et al.

(10) Patent No.: US 8,914,308 B2
(45) Date of Patent: Dec. 16, 2014

(54) METHOD AND APPARATUS FOR INITIATING A TRANSACTION ON A MOBILE DEVICE

(71) Applicant: Bank of America Corporation, Charlotte, NC (US)

(72) Inventors: Mary R. Rosendahl, Wilmette, IL (US); Milton Santiago, Jr., Chicago, IL (US); Daniel M. Whipple, Harrisburg, NC (US); Darin G. Mallory, Plainfield, IL (US); Christopher Hope, Toonbridge Kent (GB); Savit A. Pirl, Bolingbrook, IL (US)

(73) Assignee: Bank of America Corporation, Charlotte, NC (US)

( * ) Notice: Subject to any disclaimer, the term of this patent is extended or adjusted under 35 U.S.C. 154(b) by 43 days.

(21) Appl. No.: 13/749,268

(22) Filed: Jan. 24, 2013

(65) Prior Publication Data

US 2014/0207675 A1    Jul. 24, 2014

(51) Int. Cl.
  G06Q 40/00 (2012.01)
  G06F 7/00 (2006.01)
  G06F 17/30 (2006.01)
  G07B 17/00 (2006.01)
  G07F 19/00 (2006.01)
  G06Q 20/32 (2012.01)

(52) U.S. Cl.
  CPC .............. *G06Q 20/322* (2013.01); *G07F 19/00* (2013.01); *G06F 17/30* (2013.01); *G06F 7/00* (2013.01); *G06Q 40/00* (2013.01); *G07B 17/00* (2013.01)
  USPC .................. 705/44; 705/30; 705/35; 705/39; 705/41; 707/805

(58) Field of Classification Search
  None
  See application file for complete search history.

(56) References Cited

U.S. PATENT DOCUMENTS

| | | | | |
|---|---|---|---|---|
| 7,269,623 | B2 * | 9/2007 | Neely et al. | 709/205 |
| 7,620,595 | B1 * | 11/2009 | Holt et al. | 705/38 |
| 7,734,999 | B2 * | 6/2010 | Leung et al. | 715/222 |
| 7,783,613 | B2 * | 8/2010 | Gupta et al. | 707/693 |
| 7,848,740 | B2 * | 12/2010 | Hyyppa et al. | 455/419 |
| 7,853,782 | B1 * | 12/2010 | Geddes | 713/151 |
| 7,873,353 | B2 * | 1/2011 | Kloba et al. | 455/412.2 |
| 7,979,893 | B2 * | 7/2011 | Ontaneda et al. | 726/2 |
| 7,991,694 | B2 * | 8/2011 | Takayama | 705/41 |
| 8,167,710 | B2 * | 5/2012 | Agarwal et al. | 463/25 |
| 8,170,372 | B2 * | 5/2012 | Kennedy et al. | 382/291 |
| 8,233,751 | B2 * | 7/2012 | Patel et al. | 382/306 |
| 8,346,950 | B1 * | 1/2013 | Andreessen et al. | 709/229 |
| 8,359,475 | B2 * | 1/2013 | Griffin | 713/186 |
| 8,374,963 | B1 * | 2/2013 | Billman | 705/44 |
| 8,444,048 | B1 * | 5/2013 | Nidamarthi et al. | 235/375 |
| 8,577,756 | B2 * | 11/2013 | Kumar et al. | 705/27.2 |
| 8,645,222 | B1 * | 2/2014 | Tamassia et al. | 705/26.1 |

(Continued)

*Primary Examiner* — Gregory Johnson
(74) *Attorney, Agent, or Firm* — Weiss & Arons LLP; Michael A. Springs, Esq.

(57) ABSTRACT

A method and apparatus that improves the operation of treasury management functionality for a cash positioning and reporting system is provided. Several portions of the payment process may be improved. The initiation process may be streamlined by providing supplemental contact information. Transactions may be initiated from trusted templates or groups of templates. Likewise transfers between internal accounts may be created. At each stage of the process views of current transaction/transfer initiations may be viewed. Transactions that have been successfully initiated may be confirmed. Incomplete or unsuccessful initiation may be reconciled for further action by a user. Templates and transfers may be grouped and sorted.

24 Claims, 15 Drawing Sheets

(56) References Cited

U.S. PATENT DOCUMENTS

| | | | |
|---|---|---|---|
| 2002/0002513 A1* | 1/2002 | Chiasson | 705/27 |
| 2002/0035539 A1* | 3/2002 | O'Connell | 705/39 |
| 2002/0069057 A1* | 6/2002 | Kapust et al. | 704/235 |
| 2002/0123359 A1* | 9/2002 | Wei et al. | 455/466 |
| 2003/0046291 A1* | 3/2003 | Fascenda | 707/10 |
| 2003/0117446 A1* | 6/2003 | Esposito-Ross et al. | 345/810 |
| 2003/0120596 A1* | 6/2003 | Sharp | 705/40 |
| 2004/0078340 A1* | 4/2004 | Evans | 705/64 |
| 2004/0088655 A1* | 5/2004 | Inose et al. | 715/526 |
| 2004/0139157 A1* | 7/2004 | Neely et al. | 709/205 |
| 2004/0215467 A1* | 10/2004 | Coffman et al. | 705/1 |
| 2004/0250085 A1* | 12/2004 | Tattan et al. | 713/186 |
| 2005/0027683 A1* | 2/2005 | Dill et al. | 707/2 |
| 2005/0119992 A1* | 6/2005 | Martino | 707/1 |
| 2005/0187873 A1* | 8/2005 | Labrou et al. | 705/40 |
| 2006/0149990 A1* | 7/2006 | S. et al. | 714/1 |
| 2007/0102510 A1* | 5/2007 | Beemer et al. | 235/380 |
| 2007/0133566 A1* | 6/2007 | Copps | 370/395.52 |
| 2007/0299789 A1* | 12/2007 | Young | 705/400 |
| 2008/0040262 A1* | 2/2008 | D K et al. | 705/39 |
| 2008/0056467 A1* | 3/2008 | Martino | 379/93.01 |
| 2009/0049148 A1* | 2/2009 | McLennan | 709/206 |
| 2009/0076951 A1* | 3/2009 | Szamel | 705/39 |
| 2009/0125429 A1* | 5/2009 | Takayama | 705/35 |
| 2009/0138415 A1* | 5/2009 | Lancaster | 706/11 |
| 2009/0326995 A1* | 12/2009 | Sorisi et al. | 705/7 |
| 2010/0095130 A1* | 4/2010 | Bertran et al. | 713/189 |
| 2010/0153520 A1* | 6/2010 | Daun et al. | 709/218 |
| 2010/0228683 A1* | 9/2010 | Ansley et al. | 705/348 |
| 2010/0250647 A1* | 9/2010 | Rajan | 709/203 |
| 2011/0218838 A1* | 9/2011 | Byce et al. | 705/7.31 |
| 2011/0313874 A1* | 12/2011 | Hardie et al. | 705/26.1 |
| 2011/0313917 A1* | 12/2011 | Lawson et al. | 705/40 |
| 2012/0022997 A1* | 1/2012 | Vasinkevich | 705/37 |
| 2012/0066062 A1* | 3/2012 | Yoder et al. | 705/14.51 |
| 2012/0066286 A1* | 3/2012 | Heredia et al. | 709/201 |
| 2012/0173419 A1* | 7/2012 | Viswanath et al. | 705/40 |
| 2012/0179677 A1* | 7/2012 | Roselli et al. | 707/736 |
| 2012/0204035 A1* | 8/2012 | Camenisch et al. | 713/186 |
| 2012/0303425 A1* | 11/2012 | Katzin et al. | 705/14.4 |
| 2012/0303697 A1* | 11/2012 | Alstad | 709/203 |
| 2012/0317027 A1* | 12/2012 | Luk et al. | 705/44 |
| 2012/0330769 A1* | 12/2012 | Arceo | 705/21 |
| 2013/0024371 A1* | 1/2013 | Hariramani et al. | 705/41 |
| 2013/0036023 A1* | 2/2013 | Koplovitz et al. | 705/26.8 |
| 2013/0036196 A1* | 2/2013 | Chan et al. | 709/217 |
| 2013/0041934 A1* | 2/2013 | Annamalaisami et al. | 709/203 |
| 2013/0046693 A1* | 2/2013 | Ayedun et al. | 705/44 |
| 2013/0063613 A1* | 3/2013 | Conwell | 348/207.99 |
| 2013/0137405 A1* | 5/2013 | Kirik et al. | 455/414.1 |
| 2013/0159446 A1* | 6/2013 | Carlson et al. | 709/207 |
| 2013/0166332 A1* | 6/2013 | Hammad | 705/5 |
| 2013/0232232 A1* | 9/2013 | Reza | 709/219 |
| 2013/0341417 A1* | 12/2013 | Argue et al. | 235/494 |
| 2014/0101734 A1* | 4/2014 | Ronda et al. | 726/5 |
| 2014/0207675 A1* | 7/2014 | Rosendahl et al. | 705/44 |

\* cited by examiner

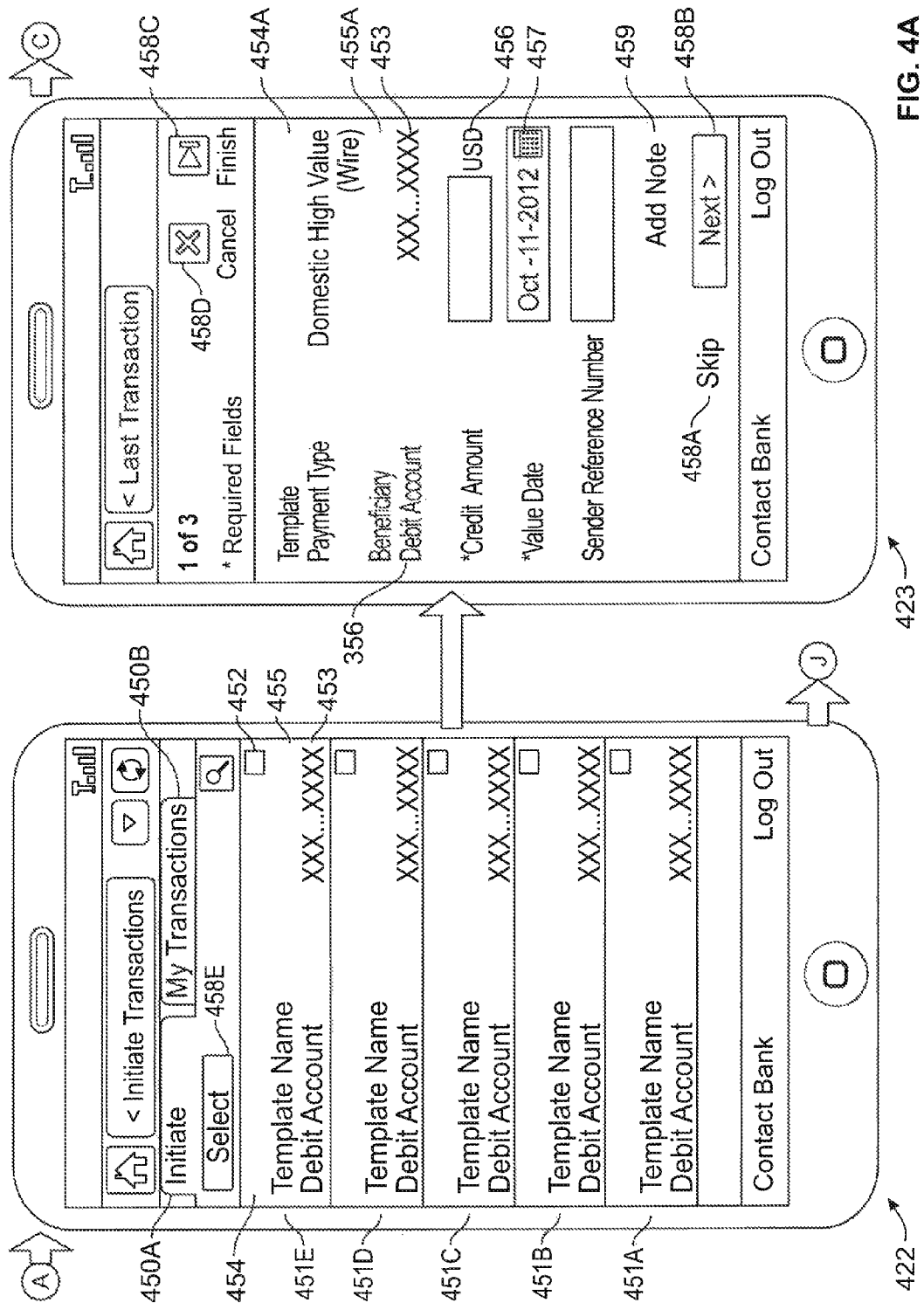

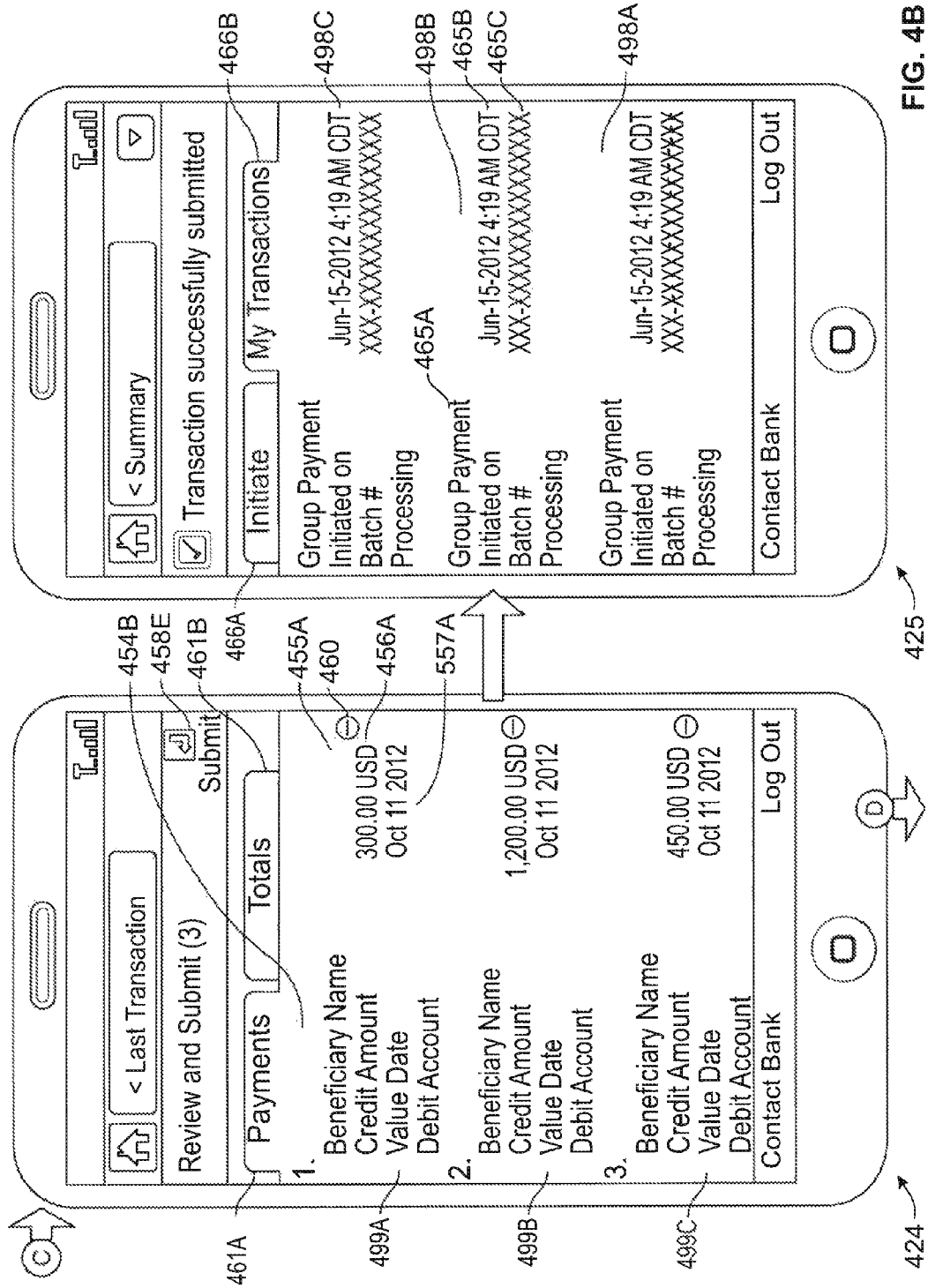

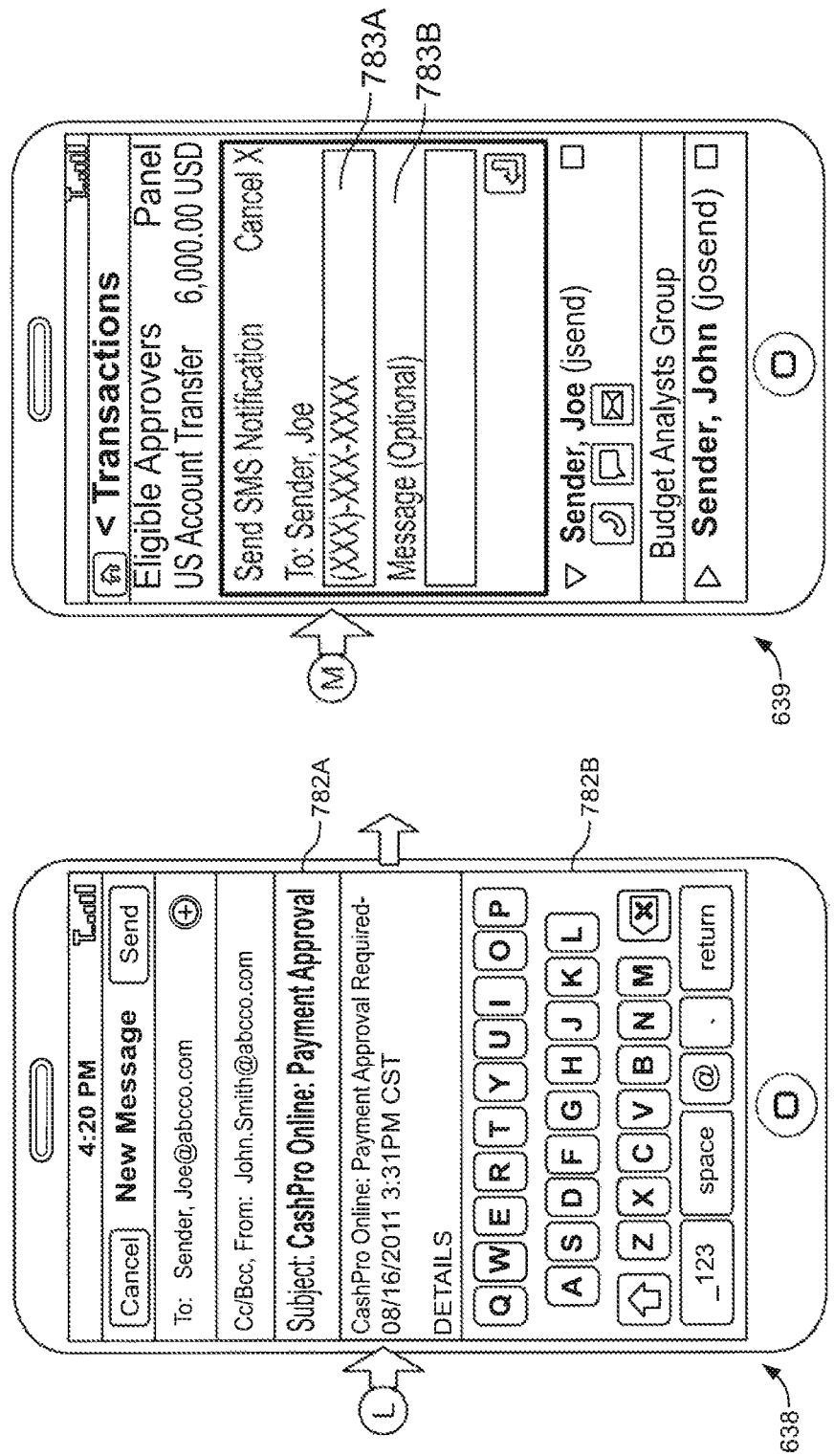

METHOD AND APPARATUS FOR INITIATING A TRANSACTION ON A MOBILE DEVICE

FIELD OF TECHNOLOGY

Aspects of the disclosure relate to a cash positioning and reporting system displayed on a mobile device. Cash positioning typically refers to tracking daily cash positions for an entity and/or management of treasury functions.

BACKGROUND

For the purpose of this application, treasury functions may include receiving payments, facilitating payments, stopping checks, etc. Facilitation of payments may include facilitating wire transfers or providing access to lines of credit. It should be noted that payments may be in different currencies and may require currency conversion.

Wire transfer or credit transfer is a method of electronic funds transfer from one person or institution (entity) to another. A wire transfer can be made from one bank account to another bank account or through a transfer of cash at a cash office.

Central bank wire transfer systems, such as the Federal Reserve's FedWire system in the United States typically operate as Real Time Gross Settlement ("RTGS") systems. RTGS systems provide the quickest availability of funds because they provide immediate "real-time" and final "irrevocable" settlement by posting the gross (complete) entry against electronic accounts of a wire transfer system coordinator.

A bank wire transfer may be effected as follows: The entity wishing to do a transfer approaches a bank and gives the bank the order to transfer a certain amount of money. An international bank account number ("IBAN") and/or other codes are given as well so the bank knows where the money needs to be sent. The sending bank transmits a message, via a secure system (such as SWIFT or Fedwire), to the receiving bank. The message provides payment instructions. The message also includes settlement instructions. The actual transfer may not be instantaneous: funds may take several hours or even days to move from the sender's account to the receiver's account. Either the banks involved holds a reciprocal account with each other, or the payment must be sent to a bank with such an appropriate reciprocal account, a correspondent bank, for further transfer to the ultimate recipient.

The payment process may require initiation via an internal system. After a payment is initiated it may require one or more levels of approval. Initiation may be a manual or a partially manual process. Conventional confirmation of payment initiation or approvals may require multiple phone calls, emails, text messages or any other suitable means of communication. Tracking and display of wire transfer payments at any stage of the process in a general ledger system may be difficult.

In particular a networked mobile device such as a smartphone, Iphone™, Ipad™, Antroid™ device, Kindle™ or any other suitable device may be used to initiate or approve one or more steps of the payment process. Mobile devices typically have limited screen sizes and touch screen inputs. Therefore, a system that facilitates completing, displaying and tracking one or more of these steps on a mobile device would be desirable.

SUMMARY

An enhanced treasury management functionality for a cash positioning and reporting system is provided. Several stages of the payment process may be implemented. The initiation or approval process may be streamlined by displaying supplemental contact and/or reference information at each stage of the payment generation process. The information may be sorted and displayed in a manner that provides essential details for one or more payment stages. Additionally, confirmation of completed payment stages or steps is provided even if the mobile device fails or is temporarily disconnected from the network.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4A shows a schematic diagram of an embodiment of a portion of the display windows which accesses the payment initiation process according to the invention;

FIG. 4B shows a schematic diagram of an embodiment of a portion of the display windows which accesses the payment initiation process according to the invention;

FIG. 4C shows a schematic diagram of an embodiment of a portion of the display windows which accesses the payment initiation process according to the invention;

FIG. 7B shows a schematic diagram of an embodiment of a portion of the display windows which access the payment initiation process according to the invention;

DETAILED DESCRIPTION OF THE DISCLOSURE

Figure 1:
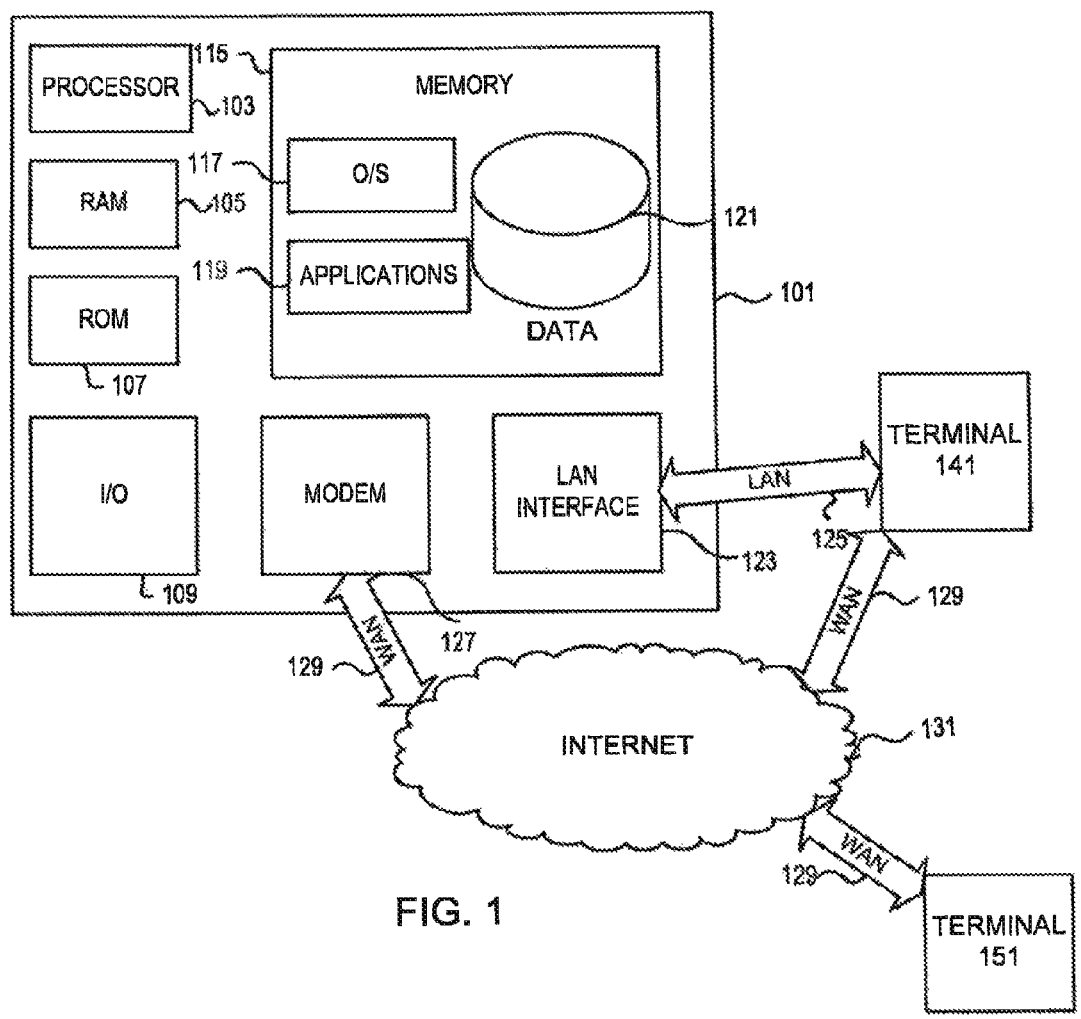
FIG. 1 illustrates a schematic diagram of a general-purpose digital computing environment in which one or more aspects of the present invention may be implemented.

Enhanced treasury management functionality for a cash positioning and reporting system is provided. Aspects of the initiation process may be streamlined by displaying selectable transactions, preferably at each stage of the initiation process in one more display windows. A display window may show a portion of the initiation process, list(s) of transactions to be initiated, list(s) of transactions that are approved/rejected and list(s) of transactions that are confirmed. A display window may show any combination of two or more lists. Transactions may be payments, transfers of funds or any other suitable financial item. Transactions may be grouped according to regions, industries, size or any other suitable method.

Transaction information may include contact information for approvers or payees. The initiation process may be the first step in the approval of an invoice. At each stage of the approval process an exemplary list of previous approvers may be provided, showing a "chain of approver-ship". Typically, the last approvers of the chain are more senior. The more senior approvers may wish to change some portion of the invoice or confirm details with a particular junior approver. The chain of approver-ship facilitates changes and confirmations.

In certain embodiments of the invention, some or all of screens may be unique to a designated country. As such, the fields in such screens may correspond to the data requirements of the country. In such embodiments, repetitive tasks such as determining which data is required for which country, may be eliminated because the system and/or method according to the invention provides country-specific screens; preferably with country-specific formatting requirements.

Selection may utilize an icon, selectable area—e.g., a transaction, a button, a highlighted area, a portion of text (sometimes called a link) or any other suitable method. Selection of any item shown on a display window may be performed by any suitable means including clicking, double clicking or the use of "gestures". Selection may highlight the item or cause a "pop-up" window, to appear, cause another display window to appear and/or to replace the currently shown display window with a different display window. Selection of an item can highlight that item or cause the display of a menu in reference to the selected item. In some cases, re-selection (a double click) may cause another display window to appear or to replace the currently shown display window with a different display window. The appearance of a new display window may be described as "opening" the display window. However, for the purposes of this application, the term "opening" refers to the action that causes the current display window to be reformatted or causes another display window to appear or causes a window to "pop-up".

When transactions are made via a wire transfer, a reference number may be provided to the payee so that payment can be confirmed and tracked. The reference number may be accompanied by additional information to facilitate tracking of the payment by the payee. Typically, a wire transfer cannot be reversed; therefore the reference number may be considered proof of payment. If the payment is used to purchase goods or services then these items may be released upon receipt of the reference number.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, flash devices and/or any combination thereof. In addition, various signals representing data or events as described herein may be transferred between a source and a destination in the form of electromagnetic waves traveling through signal-conducting media such as metal wires, optical fibers, and/or wireless transmission media—e.g. air and/or space.

Data may move between various entities in any of the embodiments of the invention via electronic transmission or manual means. Electronic transmission may utilize email, SMS or any other suitable method. Manual exchange may utilize floppy disks, USB drives, CDs, DVDs or any other suitable mechanism.

FIG. 1 is a block diagram that illustrates a generic computing device 101 that may be used according to an illustrative embodiment of the invention. Computing device 101 may be server that provides coordinating services for a number of mobile computing devices. In one alternative embodiment computing device 101 is a mobile device used to implement the invention. Mobile computing devices may also be called user devices.

Computing device 101 may have a processor 103 for controlling overall operation of the server and its associated components, including RAM 105, ROM 107, input/output module 109, and memory 115. Computing device 101 may include one or more receiver modules, server modules and processors that may be configured to transmit and receive payments, wire transfers, payments via checks, debit cards, credit cards, lines of credit or any suitable credit instrument. Likewise, computing device 101 may be configured to transmit and/or receive information and to provide information or commands from/to an Enterprise Resource Planner ("ERP") or any other suitable system. Further, computing device 101 may provide confirmation to one or more payees and facilitate payment approval processing and perform any other suitable tasks related to treasury operation within a cash positioning and reporting system. Additionally computing device 101 may provide confirmation to mobile devices or terminals 141, 151 which implement the invention.

Input/output ("I/O") module 109 may include a microphone, keypad, touch screen, and/or stylus through which a user of computing device 101 may provide input, and may also include one or more of a speakers for providing audio output and a video display device for providing textual, audiovisual and/or graphical output. The touch screen may also serve as a video display device. The touch screen may respond to "gestures"—e.g. a double tap may open an item and a pinching motion may shrink an item. The touch screen in combination with the video display may be referred to as the "display" of the device.

Software may be stored within memory 115 to provide instructions to processor 103 for enabling computing device 101 to perform various functions. For example, memory 115 may store software used by computing device 101, such as an operating system 117, application programs 119, and an associated database 121. Alternatively, some or all of computing device 101 computer executable instructions may be embodied in hardware or firmware (not shown). As described in detail below, database 121 may provide storage for customer information, invoices, approvals, various types of confirmations and any other suitable information.

Computing device 101 may operate in a networked environment supporting connections to one or more remote computers, such as mobile devices 141 and 151. Mobile devices 141 and 151 may be personal computers or servers that include many or all of the elements described above relative to computing device 101.

The network connections depicted in FIG. 1 include a local area network (LAN) 125 and a wide area network (WAN) 129, but may also include other networks. When used in a LAN networking environment, computing device 101 is connected to LAN 125 through a network interface or adapter 123. When used in a WAN networking environment, computing device 101 may include a modem 127 or other means for establishing communications over WAN 129 and/or Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. Both computing device 101 and mobile devices 141 and 151 may include networking hardware, networking software or a combination of hardware and software which enables communication over local area network (LAN) 125 and a wide area network (WAN) 129.

Additionally, application program 119, which may be used by computing device 101, may include computer executable instructions for invoking user functionality related to communication, such as email, short message service (SMS), and voice input and speech recognition applications.

Computing device 101 and/or mobile devices 141, 151 may also be mobile terminals including various other components, such as a battery, speaker, and antennas (not shown).

Computing device 101, terminal 151 and/or terminal 141 may be portable devices such as a laptop, cell phone, Blackberry™, smartphone, iPad™, iPhone™, Kindle™ or any other suitable device for storing, transmitting and/or transporting relevant information.

Any information described above in connection with database 121, and any other suitable information, may be stored in memory 115.

One or more of applications 119 may include one or more algorithms that may be used to perform one or more of the following: treasury operations, wire transfers and any other suitable tasks related to treasury operations.

Figure 2:
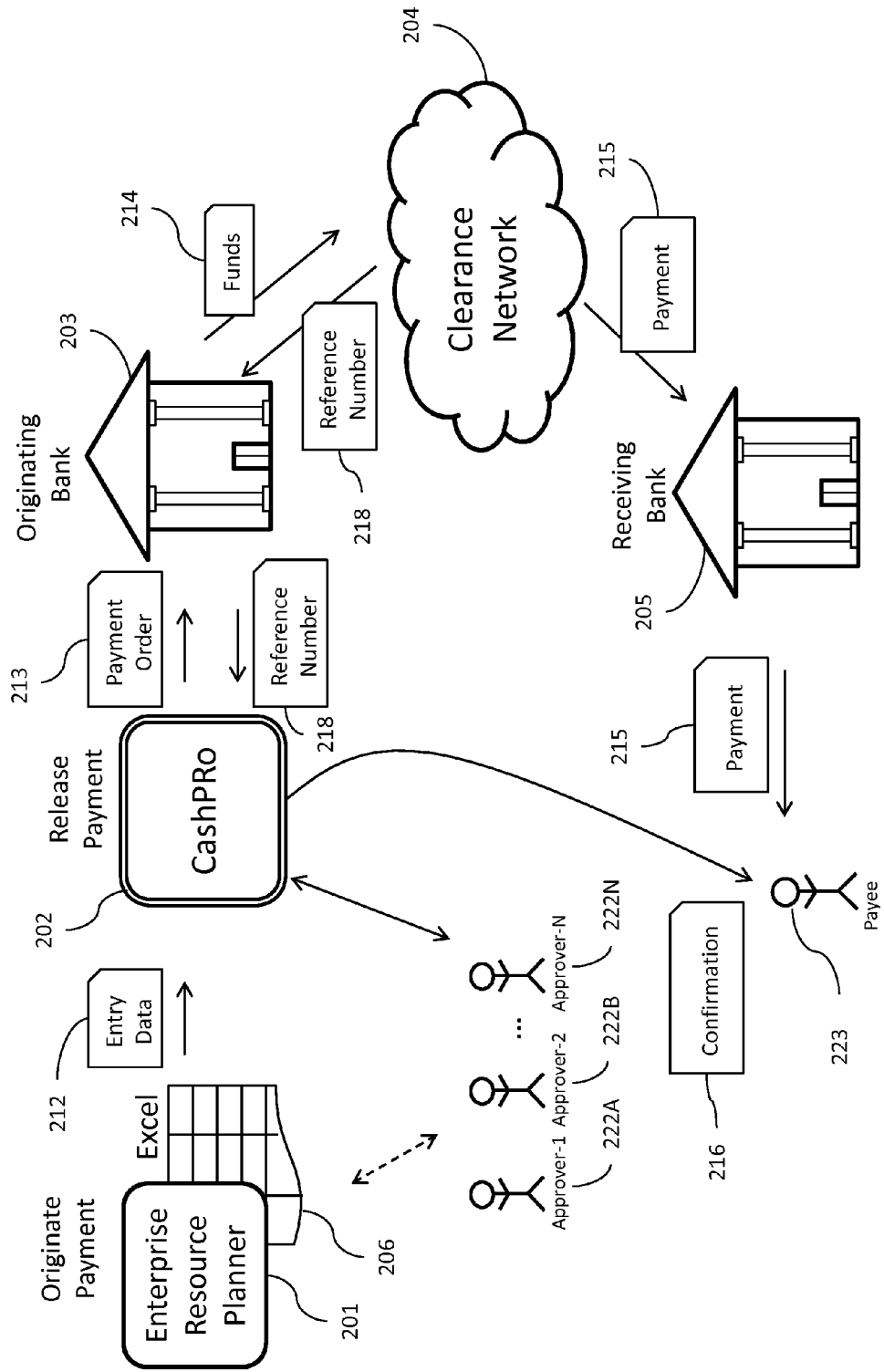
FIG. 2 shows a schematic diagram of an exemplary payment system according to the invention.

FIG. 2 shows an exemplary schematic diagram of a payment system 200 according to the invention. A similar schematic, with greater detail, is explained in copending U.S. patent application Ser. Nos. 13/361,024, 13/569,055, 13/361,044 and 13/661,083 all of which are hereby incorporated by reference herein in their respective entireties. Payment may originate in an ERP system 201, Excel workbook 206, or other similar automated, semi-automated, or manual process. ERP system 201 may be a Systems Analysis and Program development ("SAP") ERP, an Oracle™ system or any other suitable system. ERP system 201 may generate entry data 212 for a cash positioning and reporting system ("CashPro") 202. CashPro™ system 202 may provide one or more treasury functions. In the alternative, treasury functionality may be provided by a standalone system, distinct from CashPro™ system 202.

Entry data 212 may include an invoice or several invoices. Entry data 212 may use any suitable format including standard formats. Entry data 212 may be sent from ERP system 201 to CashPro™ system 202 electronically or manually. Each field of the data may be verified for correctness as is described in copending, concurrently assigned U.S. patent publication No. 2009-0319429 and is hereby incorporated by reference herein in its entirety.

Prior to the transfer of entry data 212 to CashPro™ system 202 an approval process may be required. The approval process may start in ERP system 201 and continue in CashPro™ system 202 or it may be completely contained within CashPro™ system 202. There may be separate approval processes for each of ERP system 201 and CashPro™ system 202. Typically CashPro™ system 202 coordinates the entire approval process.

CashPro™ system 202 may facilitate an approval process that involves one or more approvers. An exemplary chain of approvers are shown as Approver-1 211A, Approver-2 211B through other approvers until final approver, Approver-N 211N. The configuration of the approval process depends on user preferences. No approval at all is also contemplated and included within the scope of the invention.

After a successful conclusion to the approval process, CashPro™ system 202 may produce a payment order 213, which may be sent to an originating bank 203. Payment order 213 may include a transaction number. Payment order 213 may be delivered by electronic, manual or any other suitable means.

Originating bank 203 may deliver funds 214 to a clearance network 204. Clearance network 204 may be a wire transfer clearance facility—e.g., the Federal Reserve Bank of the United States. As described above, delivery of funds 214 via a wire transfer to a clearance network 204 cannot be reversed. Delivery of funds may be by electronic, manual or any other suitable means.

Clearance network 204 may return a reference number 218 to originating bank 203. Reference number 218 may be accompanied by supplemental data and a matching transaction number. Originating bank 203 may return reference number 218 and any supplemental data to CashPro™ system 202. Delivery of reference number 218 by clearance network 204 and/or originating bank 203 may be by electronic, manual or any other suitable means. Reference number 218 may be a clearance reference number as is provided by the Federal Reserve Bank of the United States or any equivalent reference number.

CashPro™ system 202 may provide confirmation 216 to payee 219. Confirmation 216 may include reference number 218, invoice information and/or any other suitable information. Confirmation 216 may be delivered by electronic, manual or any other suitable means. In some cases a reference number 218 may not be provided. In some cases reference number 218 may be provided but would not be included in confirmation 216.

Clearance network 204 may provide payment 215 to receiving bank 205. Receiving bank 205 may provide payment 215 to payee 219. All payments may be transferred by electronic, manual or any other suitable means.

Although a single ERP 201, CashPro™ system 202, originating bank 203, clearance network 204, receiving bank 205 and payee 219 are shown, more than one of any of the aforementioned items are contemplated and are included within the scope of the invention. Likewise, multiple entry data sets, payments orders, funds, reference numbers, confirmations, and invoices are contemplated and are included within the scope of the invention. Further, multiple items may be included in a single item—e.g., multiple invoices may be included in a single entry data 212.

Figure 3:
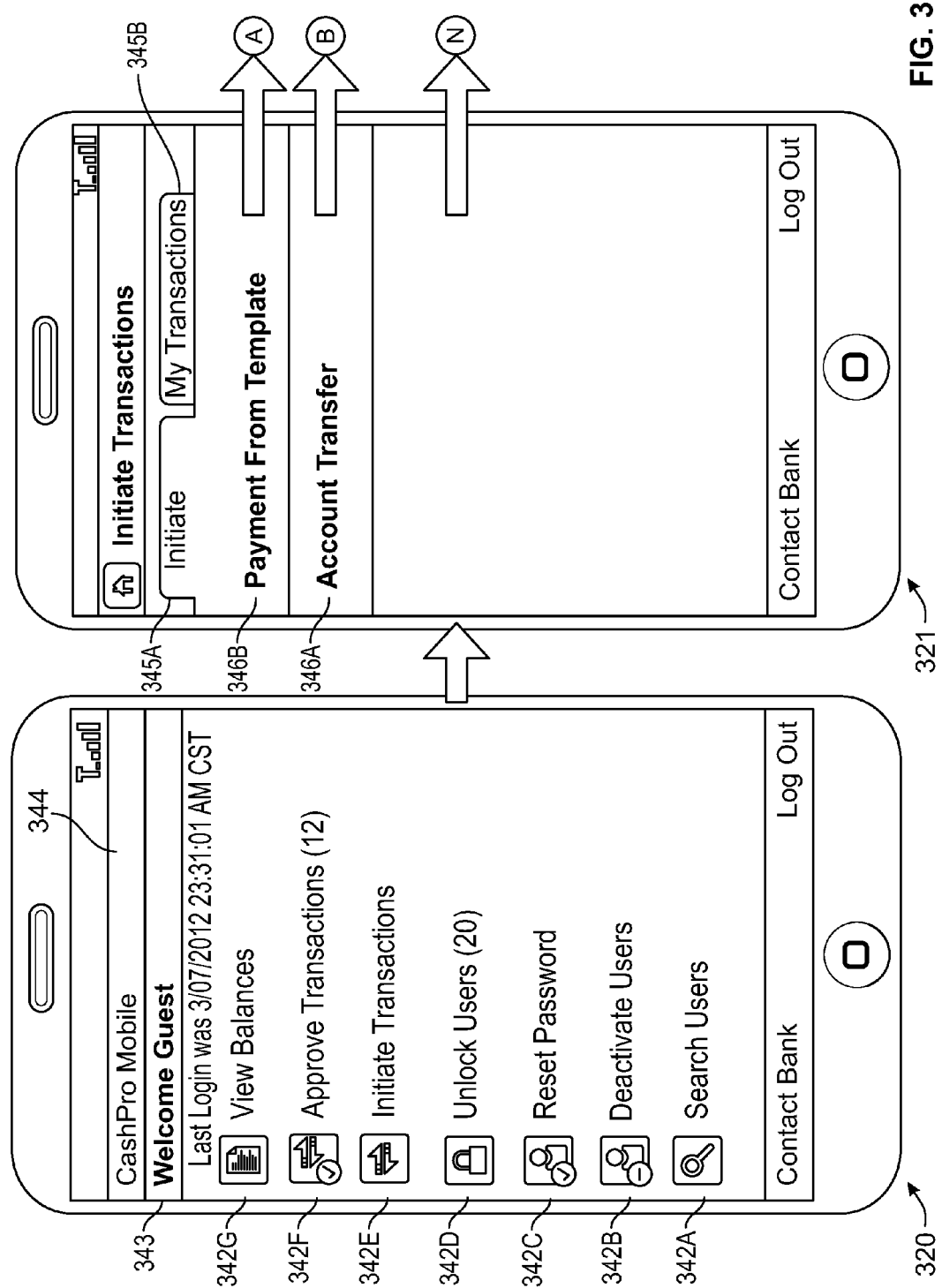
FIG. 3 shows a schematic diagram of an embodiment of a portion of the display windows which accesses the payment initiation process according to the invention.

FIG. 3 shows an embodiment of the display windows which access the payment initiation process according to the invention. For this embodiment, and all other embodiments described in the remainder of the description, the display windows may be shown on mobile device such as mobile terminals 141, 151 or on a server such as computing device 101. Although reference is made to elements of FIG. 2, other ERP, CashPro™ systems, banks and clearance networks, reference numbers, etc., may be used in this embodiment or any suitable variation of this embodiment. Although each display window is shown as the only displayed item, each display window of the invention may occupy a portion or the entirety of the available display area of the device. In some embodiments fixed areas for the display area may display advertisements, user information—e.g., the user's name and/or operating system elements such as a battery life icon, clock or any other suitable items.

In this description a list refers to an entire list of zero items, one item or many items. However, it is understood that typically only a portion of the list is displayed on the display window. Although an exemplary set of entries are shown in the figures for clarity, various devices may alter the manner in which each display window is shown. Various factors such as screen size, pixel count, font size, etc., may limit the number of entries and/or sections displayed. In each case entries, portions of a list or portions of the displayed information that do not fit in the available display area may preferably be accessed by scrolling.

Display window 320 may show exemplary elements of a list of home screen items including a search users item 342A, a deactivate users item 342B, a reset password item 342C, an unlock users item 342D, an initiate transactions items 342E, an approve transactions item 342F and a view balances item 342G. The top of display window 320 may display user's name 343 and application name 344—e.g., CashPro™. Other items or applications may also be shown on display window 320 ("home" display window) or may be shown by scrolling the menu. Opening approve transactions item 342E may display initiate transactions window 321.

Initiating a transaction, typically a payment or a funds transfer, may be understood for the purposes of the application to be the creation of a transaction. Once the transaction has been created and reviewed it is submitted to the approval process shown in FIG. 2 and described in more detail in patent application Ser. Nos. 13/361,024, 13/569,055, 13/361,044 and 13/661,083. In the alternative, initiating a transaction may submit that transaction to the approval process without review.

Initiate transactions display window 321 may include an initiate tab 345A and a "my transactions" tab 345B. Initiate transactions tab 345A may appear by default when initiate transactions display window 321 is opened. Opening initiate transactions tab 345A may display a payment from template item 346B and an account transfer item 346A. Other suitable items such as access to "free-form" items may be shown in initiate tab 345A. Opening of "my transactions" tab 345B may be equivalent to opening my transactions tab 645B as discussed below.

Opening payment from template item 346B displays initiate transactions template display window 422 shown in FIG. 4A. Initiate transactions template display window 422 may be reached by following off-page connector A. A template may be the outline of a transaction, typically a payment. Preferably, a payment described by a template represents payments to a-priori trusted receivers of funds, where each receiver of funds is a trusted "client/customer" or an internal account. A trusted receiver of funds is typically a vendor with which there is a long standing relationship with regular payments. In the alternative a trusted receiver of funds may be a division within the same company. In the alternative a template may be the outline of any sort of transaction—e.g., a payment or transfer.

Typically selection and completion of a template creates a reviewable transaction. A reviewable transaction may be a payment constructed according to the template. A reviewable transaction is initiated and becomes a transaction submitted for approval. An exemplary template may specify the receiver of funds and receiving account but leave the payment amount and date open.

Typically free-form payments to arbitrary accounts from a mobile device are not provided, due to the risk of misuse. However, free-form payments from a mobile device are contemplated and included within the scope of the invention. Such payments may be initiated via the payments from template item 346B or from a separate item or tab.

Initiate transactions template display window 422 may include an initiate tab 450A, a "my transactions" tab 450B and a select button 458E. Initiate tab 450A may appear by default when initiate transactions display window 422 is opened. Opening initiate tab 450A may display exemplary elements of a list of templates 451A-451E that may used to initiate a transaction. Each template 451A-451E represents an existing receiver of funds as described above. There may be a large number of templates in the system. Opening my transaction tab 450B may be the same as opening my transactions tab 345B.

Exemplary template 451E may include a checkbox 452, payment number 453, a template shortname link 454 and a template name 455 as well as other suitable information such as a group name. Groups are described below. Each template 451A-451E may include similar information in a typical display 422. Payment number 453 may be a wire transfer routing number, an account number and or any other suitable number used for payment.

The list of templates may be scrolled to enable selection of one or more templates to be opened. As described above any list may include items that are not displayed initially but are available via scrolling the display.

Opening a template—e.g., exemplary template 451E— may display detailed template display window 423. Exemplary template 451E may be opened by selecting template shortname link 454 or by selecting template 451E. In the alternative, checkbox 452 may be checked for one or more templates 451A-451E. After one or more checkboxes are checked, all of the templates may be compiled into a list of transactions. Each transaction on the list may be opened in detailed display window 423 by any suitable method including selecting select button 458E.

Lists of templates for initiating a transaction can be created with a single template, combinations of templates from one or more groups, sorted templates or any combination of groups and templates. Likewise one or more checkboxes 452 may be checked to create a group of templates. Groups are discussed in more detail below.

Detailed template display window 423 may arranged to display the details of one or more templates—e.g., template 451E. Typically detailed template display window 423 would show on template from a list (carousel) of selected templates. Typically the display would show all of the necessary details for completing a transaction from a single template. Typically, as described above, the transaction is a payment to a known receiver of funds. Typically as discussed above, completion of at least some of the template details followed by submission creates a reviewable transaction.

Detailed template display window 423 may include a template shortname name 454A, a template name link 455A, a payment number 453, a payment amount entry 456, a value date selector 457, an add note link 459, a skip button 458A, a next button 458B, a finish button 458C and a cancel button 458D as well as other suitable information such as a group name. Some or all of this information may be entered to initiate payment—e.g., a payment amount or a value date. In the alternative some or all of the information may have default values that may be changed. In another alternative, no user input is required.

Selecting add note link 459 may permit the addition of one more notes to the transaction. In the alternative notes may be attached to the template. Selecting add note link 469 may show a note entry form in a "pop-up" window or in another display window (not shown).

Selecting skip button 458A may open the next template on the list without completion of user input. Selecting next button 458B may open the next template on the list after completion of user input. Selecting cancel button 458D terminates initiation based on the list of templates. Selecting selectable template name link 455A may display details regarding that client/customer. Selecting finish button 458C submits one or more completed template(s) which are converted to one or more reviewable transaction(s).

Selecting finish button 458C may also open review/submit display window 424, shown in FIG. 4B. Review/submit display window 424 may be reached by following off-page connector C. Review/submit display window 424 may show payment tab 461A, a totals tab 461B and a submit button 458E. Payment tab 461A may appear by default when review/submit display window 424 is opened. Opening payment tab 461A may display exemplary elements of a list of reviewable transactions 499A-499C. Each reviewable transaction 499A-499C represents a reviewable transaction which may be submitted or removed from the list.

Exemplary reviewable transaction 499A may include a template shortname link 454B and a template name 455 a payment amount 456A, a value date 457A and a remove transaction button 460 as well as other suitable information such as a group name. Each reviewable transaction 499A-499C may include similar information in a typical display 424. Value date 557A represents the last acceptable date/time for a timely payment. Failure to pay on time may result in loss of faith, interest payments, penalties, etc.

Selecting remove transaction button 460 removes that transaction from the list of transactions to be initiated. Following removal of the transaction, selecting selectable template name 454B may initiate that particular transaction without initiating the rest of the transactions on the list.

Selecting submit button 458E submits all of the transactions from the list and may open initiated transactions display window 425. Initiated transactions display window 425 may show a list of transactions that are confirmed as submitted—i.e. the transaction have been submitted to the approval process as described above with reference to FIG. 2.

Because the connection to a mobile device maybe inconsistent or irregular, a user may initiate a transaction on his or her device—e.g. mobile terminal 141,151—without gaining the full effect of the desired action. In some cases only a portion of the data or none of the data necessary to initiate the approval process are sent to the server 101. The data, or a portion of it, may not be sent because of software errors or because the connection to the server was severed or is error prone. At some future time the user device 141,151 may reconnect to server 101 and make another attempt to submit the transaction(s) to the approval process. At other times user devices 141,151 may be unable to complete the transaction irrespective of the number of attempts. Display window 425 may show a list of transactions sent from the server. Each item on this list is confirmed as initiated. The list of confirmed transactions may be described as a checkpoint. Since this list is stored on the server, the user can be certain that these transactions are submitted. Typically, this functionality is not necessary for personal computer based implementations because the connections to the network are more reliable. However, confirmation of submission may also be provided for any implementation of the initiation process to provide "peace of mind" to the user.

In some embodiments mobile device 141,151 may be able to reconcile the list of initiated transactions with the list of attempted to submit transaction in order to identify a list (not shown) of transactions that are in a "limbo" state—i.e., submitted but not confirmed as initiated. In some embodiments devices 141, 151 may be able to reset the state of transactions on mobile devices 141, 151 to the review/submit list display on review/submit display window 424. In some embodiments mobile devices 141, 151 may query the server regarding the list of attempted to submit transactions and server 101 send reconciled lists and an updated confirmed initiated list to user devices 141, 151.

Opening initiated transactions display window 425 may include an initiate tab 466A and a "my transactions" tab 466B. My transactions tab 466B may appear by default when in initiated transactions display window 425 is opened. Opening my transactions tab 466B may display exemplary elements of a list of initiated transactions 498A-498C. Each initiated transaction 498A-498C may be a confirmed as an initiated transaction as described above. Typically, opening initiate tab 466A is the same as opening initiate tab 345A. In the alternative opening initiate tab 466A may be the same as opening initiate tab 450A.

Exemplary initiated transaction 498B may include a group name link 465A, an initiate date 465B and a batch number 465C as well as other suitable information such as a group name. The term "group" will be explained below. Each initiated transaction 498A-498C may include similar information in a typical display 425. Initiate date 465B may represent the date, or timestamp, when the transaction or group payment has been confirmed as submitted to the approval process described above. Selecting group name link 465A may open further display windows as described below.

Selecting totals tab 461B, shown as part of review/submit display window 424 may open totals display window 426, shown in FIG. 4C. Totals display window 426 may be reached by selecting the totals tab in FIG. 4C (indicated schematically in FIG. 4C by following off-page connector D). Opening totals display window 426 may show a payments tab 461A and a totals tab 461B. Typically totals tab 461B is displayed when totals display window 426 is opened.

Totals display window 426 typically displays a total 462 of all transactions that are pending in review/submit display window 424. As described above, some of the list of pending transactions may not be displayed on review/submit display window 424. The pending transactions may components of a group or may be an ad hoc list composed by the user as described above.

Total 462 may be displayed in any currency. The displayed currency may be a default based on the location of the device or based on the users preferences. Selecting payments tab 461A may open payments tab 461A as described above regard to review/submit window 424.

Figure 5A:
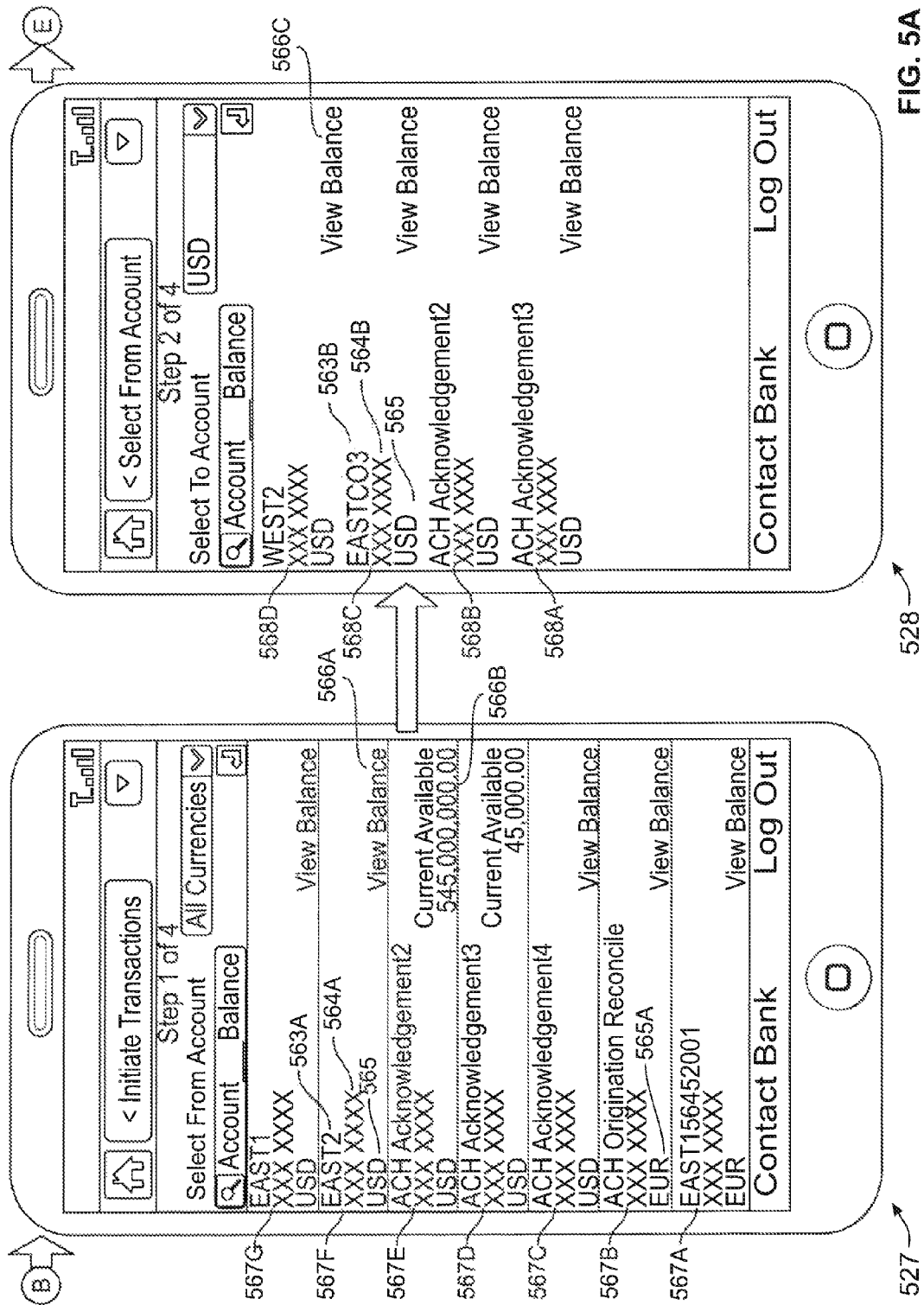
FIG. 5A shows a schematic diagram of an embodiment of a portion of the display windows which accesses the payment initiation process according to the invention.

Opening account transfer item 346A, of initiate transactions display window 321 shown in FIG. 3, may display transfer source display window 527, shown in FIG. 5A. Transfer source display window 527 may be reached by following off-page connector B. Typically a transfer represents a "payment" from one internal account to another internal account. In one alternative transfers may be between an external account and an internal account.

Transfer source display window 527 may display exemplary elements of a list of source accounts 567A-567G. Each source account 567A-567G may be used as the source of funds in a transfer. Typically source accounts 567A-567G are internal accounts. The list of source accounts 567A-567G may be a subset of all source accounts in the enterprise. In one alternative the user is able to view only the subset of source accounts for which the user has access privileges. In another embodiment the user may be able to view all of the accounts but may not be able to view account balances or other suitable account details as described below. In another alternative the user may be able to transfer from/to accounts for which the user cannot view the balances and/or balance details.

Exemplary source account 567F may include a source name link 563A, a source account number 564A, a view balance link 566A and a currency indicator 565. Each source account 567A-567G may include similar information in a typical display 527. Currency indicator 565 may designate currencies in US dollars, Euro—e.g., 565A—or in any other suitable currency. Selecting source name link 563A may be equivalent to opening a source account 567A-567G as described below. In the alternative selecting source name link 563A may provide further details regarding source account 567F.

Exemplary transfer source display window 527 shown in FIG. 5A shows accounts utilizing various currencies; however transfer source display window 527 may be configured to show all accounts utilizing only one currency. The choice of currency may depend on user selection or a system preference.

In the alternative view balance link 566A may be replaced or augmented with a currently available indicator 566B as shown with regard to exemplary account 567E. Currently available indicator 566B may show the amount of funds available or transfer limit.

The ability to select the view balance link 566A or to see currently available indicator 566B depends on the privileges of the user. Typically, some users will be able only view one, none or both of view balance link 566A and view currently available indicator 566B. Selecting view balance link 566A permits access to all of the details regarding that account in a "pop-up" window or in another display window (not shown).

Opening one of source accounts 567A-567G may display recipient display window 528. Opening one of source accounts 567A-567G may complete the first of four steps in the transfer initiation process.

Recipient display window 528 may display exemplary elements of a list of recipient accounts 568A-568D. Each recipient account 568A-568D may be used as the recipient of funds in a transfer. Typically recipient accounts 568A-568D are internal accounts. As described above with regard to source accounts 567A-567G, the user may be able to view only a subset of recipient accounts for which the user has access privileges or may be able to view all of the accounts but may not be able to view account balances or other suitable account details.

Exemplary recipient account 568C may include a recipient name 563B, a recipient account number 564B, a view balance link 566C and a currency indicator 565. Each recipient account 568A-568D may include similar information in a typical display 528. As described above currency indicator 565 may designate currencies in US dollars, Euro or in any other suitable currency. Other recipient accounts on the list may have similar information. Selecting recipient name link 563B may be equivalent to opening recipient account 568A-568D as described below. In the alternative selecting source name link 563B may provide further details regarding recipient account 568B.

Exemplary recipient display window 528 in shown in FIG. 5A shows accounts utilizing US dollars. As described above regarding source display window 527, recipient display window 528 may be configured to show accounts utilizing one currency or a selection of currencies.

In the alternative a view balance link 566B may be replaced or augmented with a currently available indicator 566D as described above with respect to transfer source display window 527. Access to a view balance link 566B and/or a currently available indicator 566A or recipient accounts may depend on user privileges as described above with respect to source accounts.

Figure 5B:
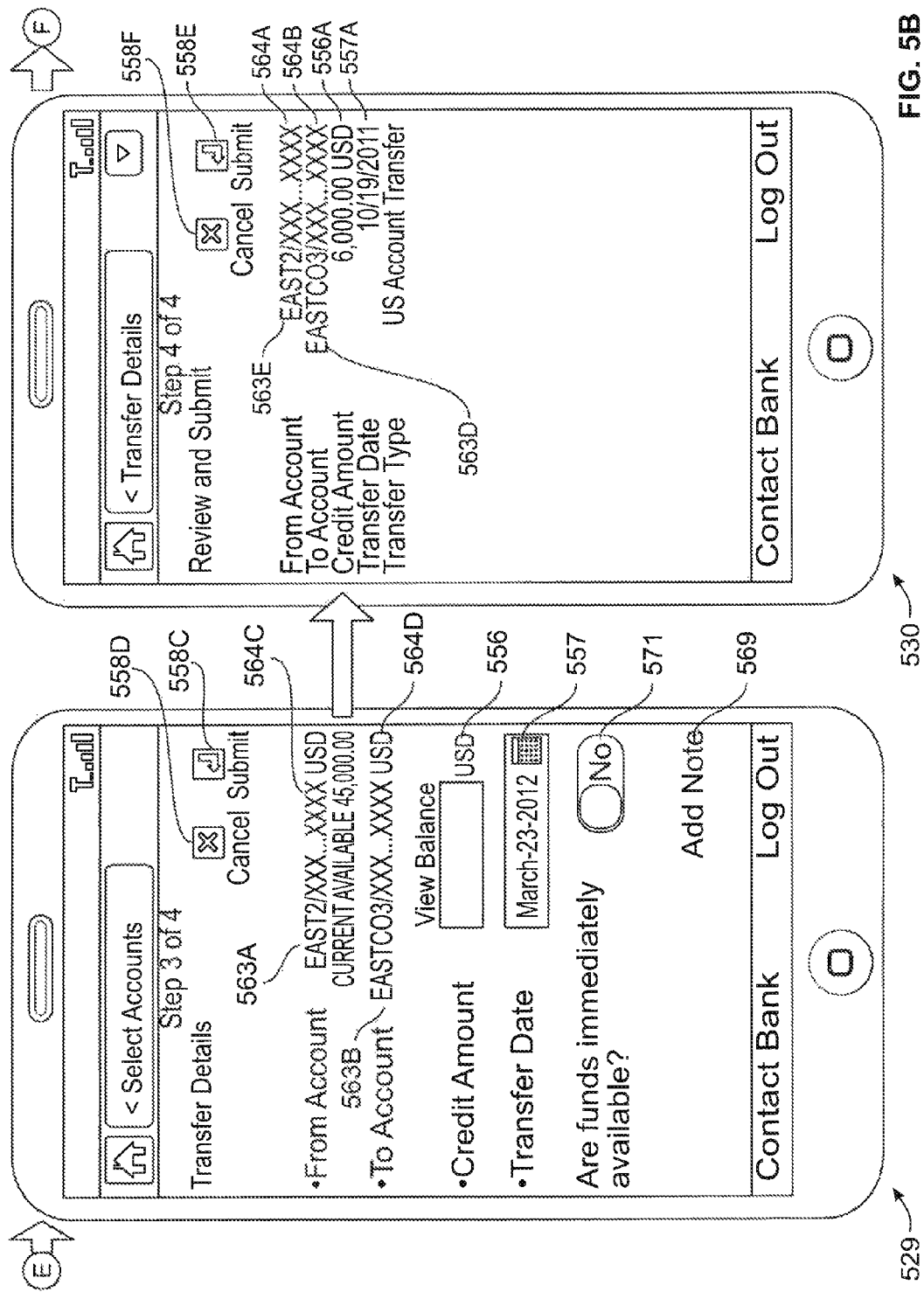
FIG. 5B shows a schematic diagram of an embodiment of a portion of the display windows which accesses the payment initiation process according to the invention.

Opening of recipient accounts 568A-568D may display transfer details display window 529, shown in FIG. 5B. Transfer details display window 529 may be reached by following off-page connector E. Opening one of recipient accounts 568A-568D may complete the second of four steps in the transfer initiation process.

Transfer details display window 529 may arranged to display the details of one or more transfers. Typically template details display window 529 would show all of the necessary details for initiating a single transfer.

Transfer details display window 529 may include a source name link 563A, a source account link 564D, a recipient name link 563B, a recipient account link 564B, a payment amount entry 556, a value date selector 557, an immediate funds button 571, an add note link 569, a submit button 558C and a cancel button 558D as well as other suitable information such as a group name. Some or all of this information may be entered to initiate payment—e.g., a payment amount or a value date. In the alternative some or all of the information may have default values that may be changed. In another alternative, no user input is required.

Selecting source name link 563A or recipient name link 563B may provide access to source or recipient accounts respectively. Selecting source account link 564C or recipient account link 564D may provide financial details regarding source or recipient accounts respectively. In the alternative source name links and source account links are a single combined link that may provide account details.

Selecting add note link 569 may permit the addition of one more notes to the transfer. In the alternative notes may be attached to the template. Selecting add note link 569 may show a note entry form in a "pop-up" window or in another display window (not shown).

Both of the source account and the recipient account may include a view balance link and/or a currently available indicator as described above.

Immediate funds button 571 may indicate the availability of funds in source account 564C. Some source accounts may have immediate availability of funds. Immediate availability may indicate that an internal system is available to complete the transfer, and/or that sufficient funds to complete the transfer are in source account 564C at this time. Internal system transfers may be less expensive than wire transfers. Selecting immediate funds button 571 when funds are immediately available may complete the transfer immediately via the internal systems.

If an internal transfer is not available then a typical wire transfer will be use to implement the transfer. If funds are not immediately available in source account 563A than the system checks every 15 minutes to see if the funds have become available. When the funds become available the transfer is implemented. Typically at the end of a business day all transfers are to be completed. Any transfers which have not been completed may be perpetuated manually. Perpetuation of a transfer may depend on the relationship an institution has with a particular client or internal account.

Selecting cancel button 558D terminates initiation of the transfer(s). Selecting submit button 558C may open transfer review/submit display window 530. Selecting submit button 558C may complete the third of four steps in the transfer initiation process.

Opening transfer review/submit display window 530 may display a single transfer.

The exemplary transfer displayed by may include a source name 563E, a source account 564A, a recipient name 563D, a recipient account 564B, a payment amount 556A, a value date 557A, a submit button 558E and a cancel button 558F as well as other suitable information such as a group name.

Figure 5C:
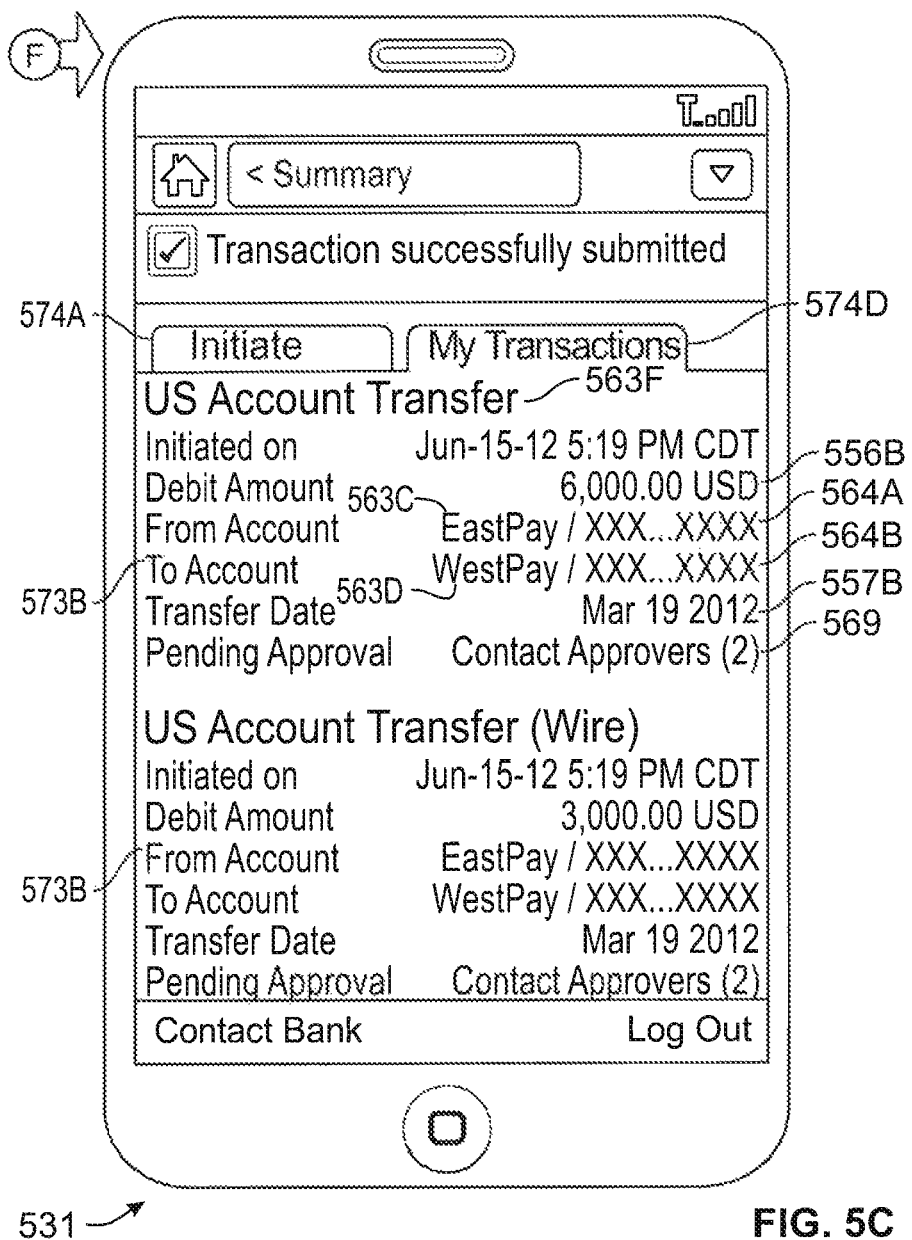
FIG. 5C shows a schematic diagram of an embodiment of a portion of the display windows which accesses the payment initiation process according to the invention.

Selecting cancel button 558F terminates initiation of the transfer(s). Selecting submit button 558E may open initiated transfers display window 531, shown in FIG. 5C. Initiated transfers display window 531 may be reached by following off-page connector F. Selecting submit button 558E may complete the fourth and final step of the transfer initiation process.

Initiated transfers display window 531 may show a list of transfers that are confirmed as submitted—i.e. the transfer(s) have been submitted to the approval process as described above with reference to FIG. 2.

Because the connection to a mobile device maybe inconsistent or irregular, a user may initiate a transfer on his or her device—e.g. mobile terminal 141,151—without gaining the full effect of the desired action. Initiated transfers display window 531 may provide the same functionality for transfers as described above with respect to transactions displayed by initiated transactions display window 425.

Opening initiated transfers display window 531 may include an initiate tab 574A and a "my transactions" tab 574D. My transactions tab 574D may appear by default when in initiated transfers display window 531 is opened. Opening my transactions tab 574D may display exemplary elements of a list of initiated transfers 573A-573B. Each initiated transaction 573A-573B may be a confirmed as initiated transfer, including all of the functionality, as described above with respect to initiated transactions 498A-498C. Typically, opening initiate tab 574A is the same as opening initiate tab 345A.

Exemplary initiated transfer 573B may include a transfer name link 563F, a source name 563C, a source account 564A, a recipient name 563D, a recipient account 564B, a payment amount 556B, a transfer date 557B, a contact approvers link 569 as well as other suitable information such as a group name. Each initiated transfer 573A-573B may include similar information in a typical display 531. Selecting contact approvers link 569 may open contact approvers display window 637 described below.

Selection of contact approvers link 569 is described below.

Selecting transfer name link 563F may display transfer detail in a "pop-up" window or any suitable display window (not shown).

Figure 6A:
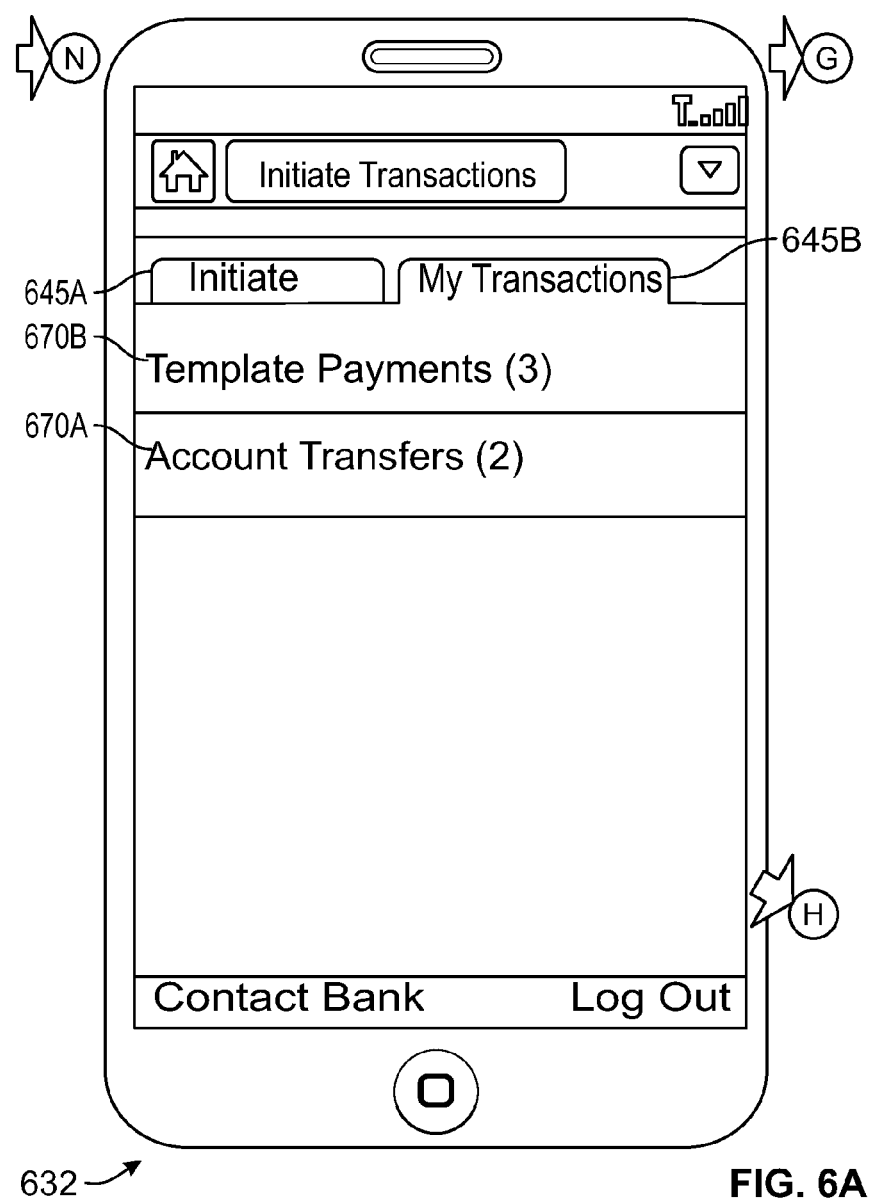
FIG. 6A shows a schematic diagram of an embodiment of a portion of the display windows which access the payment initiation process according to the invention.

Opening my transactions tab 345B of initiate transactions display window 321 shown in FIG. 3 may open a view transaction/transfers display window 632. View transaction/transfers display window 632 is shown in FIG. 6A and may be reached by following off-page connector N.

Opening view transaction/transfers display window 632 may include an initiate tab 645A and a "my transactions" tab 645B. My transactions tab 645B may appear by default when view transaction/transfers display window 632 is opened. Opening my transactions tab 645B may display a template payments item 670B and an account transfers item 670A. Other suitable items may be shown in my transactions tab 645B. Opening of initiate tab 645A may open initiate tab 345A.

Figure 6B:
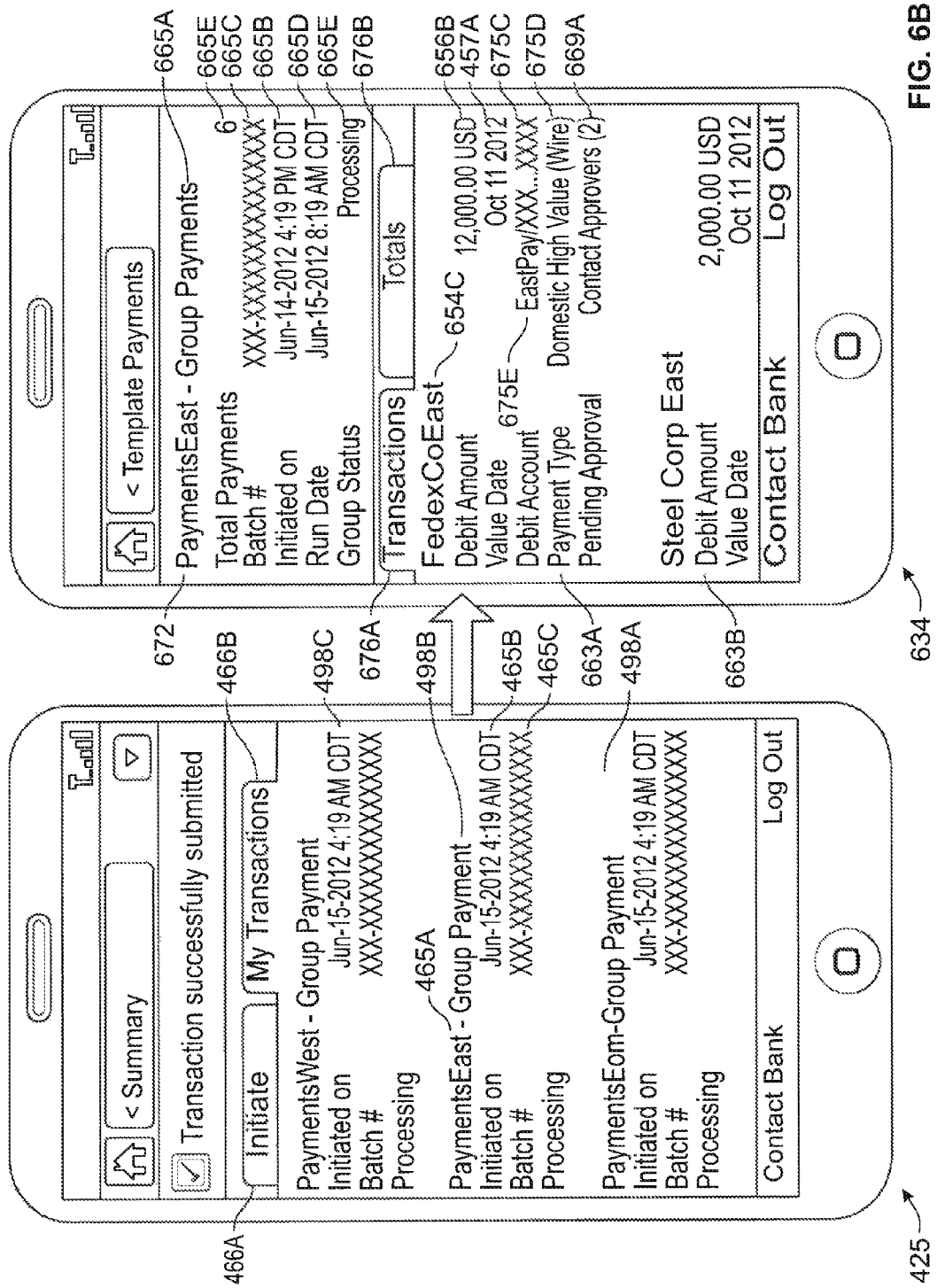
FIG. 6B shows a schematic diagram of an embodiment of a portion of the display windows which access the payment initiation process according to the invention.

Opening template payments item 670B may display my transactions display window 425 described above. A copy of my transactions display window 425 is shown in FIG. 6B and may be reached by following off-page connector G.

Opening a initiated transaction—e.g., 498B may display a initiated group details display window 634. A initiated transaction may be opened by selecting the transaction, selecting group name link 465A or by any other suitable method.

Transactions may be organized in groups as is discussed in more detail below. Typically initiated group details display window 634 displays all of the elements of a group but other alternatives such a display of all initiated transactions, a selected subset of the initiated transactions, a subset of the elements of a selected group and any combination of these alternatives is contemplated and included within the scope of the invention.

Initiated group details display window 634 may include a transactions tab 676A, a totals tab 676B and a header section 672. Transactions tab 676A may appear by default when view initiated group details display window 634 is opened. Opening transactions tab 676A may display exemplary elements of a list of grouped transactions 663A-663B and any other suitable information. Typically grouped transactions 663A-663B are members of a group specified by a group name 665A.

Header section 672 may include group name 665A, a number of payments/transactions 665E, a batch number 665C, an initiate date 665B, a run date 665D and a processing status 665C as well as any other suitable information.

Exemplary grouped transaction 663A may include a template shortname link 654C, a payment amount 656B, a value date 457A, an account name 675E, a debit account 675C, a payment type 675D and a contact approvers link 669A as well as other suitable information. Each grouped transaction 663A-663B may include similar information in a typical display 634. Payment type 675D may specify an internal transfers or a wire transfer as described above. Selecting contact approvers link 669A may open contact approvers display window 637 described below.

Selecting template shortname link 654C may display template details in a "pop-up" window or in another display window (not shown).

Selection of contact approvers link 569A is described below.

Selecting totals tab 676B may be equivalent to opening totals display window 426 except that the total 462 represents the total payments for group 665A.

Figure 6C:
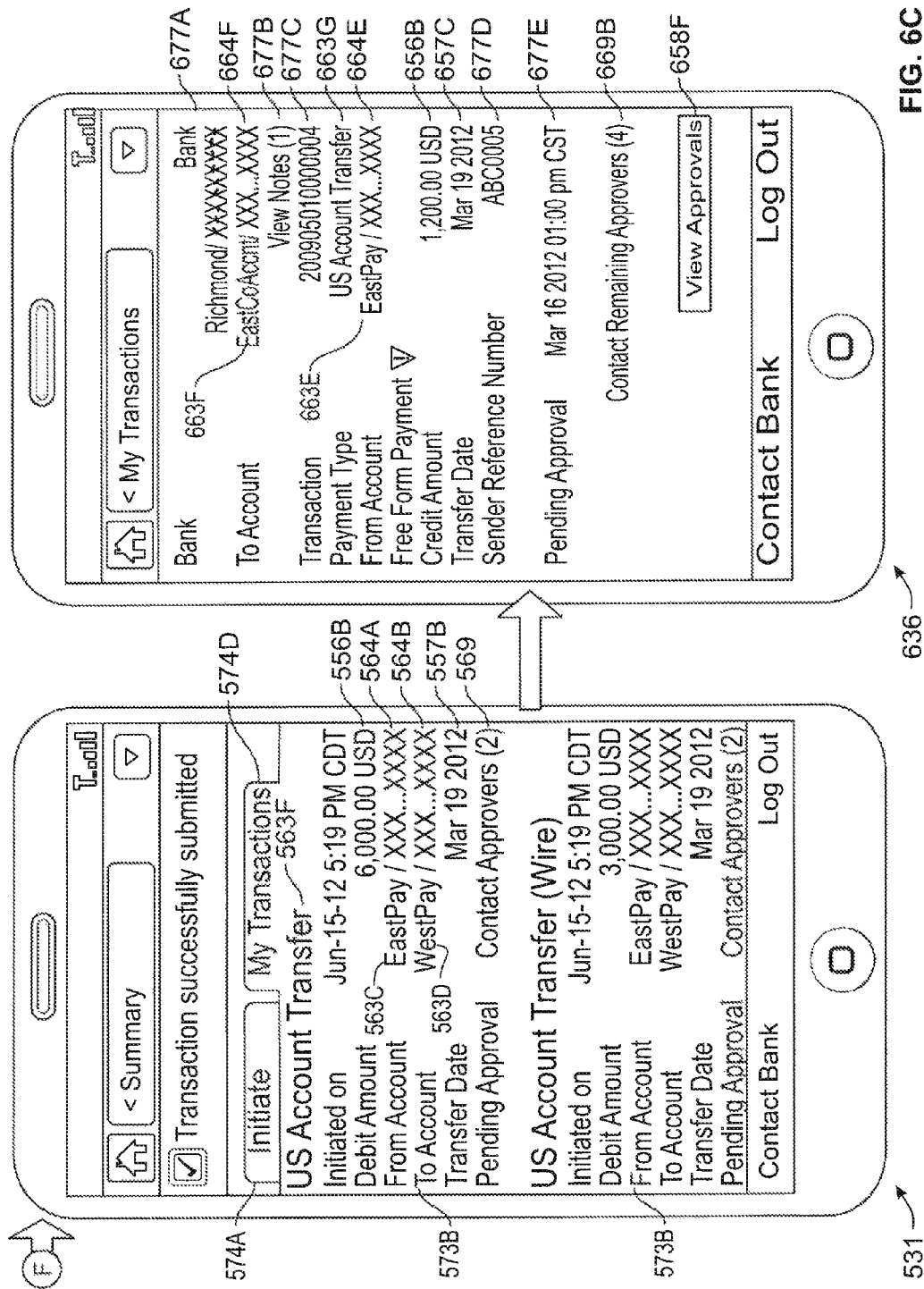
FIG. 6C shows a schematic diagram of an embodiment of a portion of the display windows which access the payment initiation process according to the invention.

Opening account transfers item 670A may display initiated transfers display window 531 described above. A copy of initiated transfers display window 531 is shown in FIG. 6C and may be reached by following off-page connector H. Opening an initiated transfer may display an exemplary initiated transfer details display window 636. Initiated transfer details display window 636 may include bank details 677A, a recipient name 663F, a recipient account 664F, a view notes link 677B, a transfer name 663G, a transaction number 677C, a source name 663E, a source account 664E, a credit amount 656B, a transfer date 657C, a sender reference number 677D, a pending approval date 677E, contact remaining approvers 669B and a view approvals button 658F. If additional initiated transfers are included, each one may include similar information in a typical display 636.

Selecting view notes link 677B may show one or more notes in a "pop-up" window or in another display window (not shown). Selecting contact remaining approvers 669B may open contact approvers display window 637 described below. Selecting view approval button 658F may display a list of completed approvals in a "pop-up" window or in another display window (not shown). In the alternative selecting view approval button 658F may display the chain of approvers Approver-1 211A, Approver-2 211B ... Approver-N 211N.

After or during the initiation process it may be useful to expedite the approval process shown in FIG. 2. Selecting contact remaining approvers 669B may open approver list display window 637. Likewise, selecting contact approvers link 569 and/or contact approvers link 669A may also open approver list display window 637. Approver list display window may be similar to other approver list display windows shown in Ser. No. 13/661,083.

Typically, one, some or all of, contact approvers link 569, contact approvers link 669A and contact remaining approvers 669B display the number of approvers that have not approved the transaction/transfer/group yet. In the alternative, one, some or all of contact approvers link 569, contact approvers link 669A and contact remaining approvers 669B may display the number of approvers required for the particular transaction/transfer. The approver list may be updated in real time so that approvers are deleted from the display as they approve the transaction/transfer/group.

Approver list display window 637 may show exemplary elements of a list of approvers for a transaction, a transfer or a group of transactions/transfers as is appropriate. Approval list display window 637 may include exemplary authorized approval contacts 780A-D. The list may show the approvers in alphabetical order, in the order of approval or any other suitable order.

Approver list display window 637 may show only the approvers that have not yet approved the transaction/transfer/group or it may show all of the required approvers. Colors, shading or any other suitable mechanisms may be used to distinguish the approvers that have already approved the transaction/transfer/group from approvers who have not approved the transaction/transfer/group. In the alternative, contact information is shown only for the approvers that have not approved the transaction/transfer/group.

Opening an approver—e.g. 780B—may reformat approver list display window 637 to show one or more methods of contacting approver 780B. In the alternative each of approvers 780A-D may automatically show one or more methods of contacting that approver.

Exemplary approver contact 780B may include one or more contact icons for approver contact 780B and a checkbox 781D. Each icon may represent a different method of contact. Exemplary contact methods shown are voice contact icon 781A, SMS contact icon 781B and email contact icon 781C. Each icon may be portrayed as a symbol indicating the type of contact method available. The icons may be placed side by side or in a cascade. The icons may cascade by type—e.g. there may be several voice icons indicating the availability of several voice contact numbers. Each approver contact 780A-780D may include similar information in a typical approver list display window 637.

"Checking" one more of checkboxes 781D followed by the selection of a contact icon may result in the contact of multiple approvers. If voice contact icon 781A is selected, each approver may receive the same voice mail, similarly each approver may receive the SMS message or the same email along with the appropriate CC list. In the alternative some types of contact—e.g., voice contact may permit only a one-to-one connection.

Selecting any icon 781A-C may active the selected method. Selecting voice contact icon 781A may dial the voice line of the selected approver. The user may be offered a selection of phone numbers—e.g., land line, mobile, home number in a pop-up window or any other suitable display window (not shown). In the alternative selecting voice contact icon 781A may connect the user to the approvers voice mailbox.

Figure 7A:
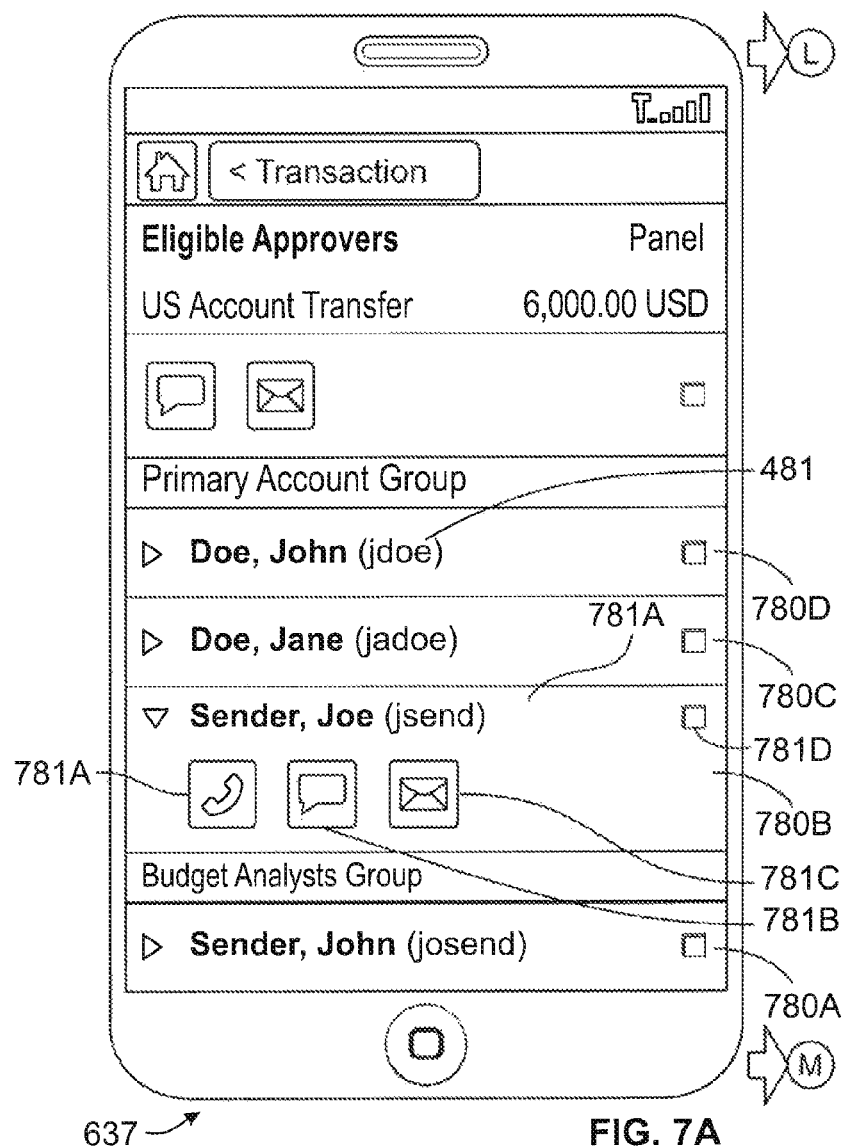
FIG. 7A shows a schematic diagram of an embodiment of a portion of the display windows which access the payment initiation process according to the invention.

Selecting email contact icon 781C may display exemplary email creation display screen 638. Exemplary email creation display screen 638 is shown in FIG. 7B which may be reached by following off-page connector L.

E mail creation display screen 638 may include an autofill contact area 782A and a "soft" keyboard 782B. Soft keyboard 782B may be used to enter the email text. In the alternative the mobile device—e.g. mobile terminal 141,151 may have a hardware keyboard.

Selecting SMS icon 781B may display exemplary SMS creation display screen 639. Exemplary SMS creation display screen 639 is shown in FIG. 7B which may be reached by following off-page connector M. SMS creation display screen 639 may include a SMS telephone number 783A and a SMS message entry area 783B.

Irrespective of the contact method, or the use of a contact method, the initiator may be required to self-authenticate. Authentication may have the effect of submission of the transaction to the approver process.

Grouping transactions may be a useful method for organizing payments. Groups may be arranged by region, clients, customer, industry or any other suitable method. Groups may be arranged hierarchically—e.g., Asia-EastAsia-China-province etc. Typically, templates will be collected into groups. A template may belong to only one group or it may belong to many groups. Typically templates or organized in groups of transactions, however transfers may also be organized in groups of transfers. In another alternative, groups may include both templates and transactions.

Initiate transactions template display window 422 shown in FIG. 4A may include sorting and creation features which include the functionality of creating and utilizing groups. Groups may be created by checking one or more templates 351A-351E.

Figure 8A:
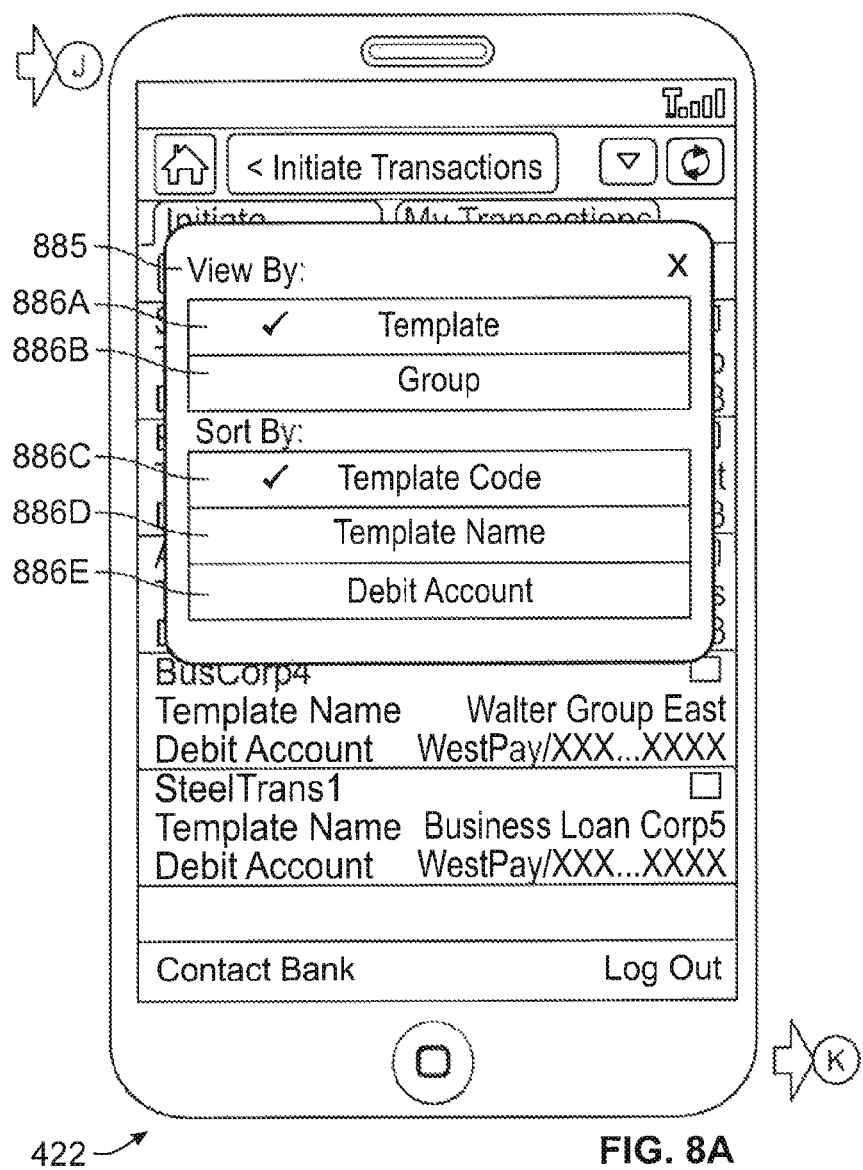
FIG. 8A shows a schematic diagram of an embodiment of a portion of the display windows which access the payment initiation process according to the invention.

Opening the sorting feature may display pop-up window 885 overlaying template display window 422 as shown in FIG. 8A and may be reached by following off-page connector J. Any suitable method may be used to open pop-up window 885. In the alternative, a separate display window or a portion of another display window may be used to create and/or utilize groups.

Exemplary pop-up window 885 may include a view by section 896A and a sort by section 896B. View by section 896A may include a view by template item 886A and a view by group item 886B. Sort by section 896B may include a sort by template code item 886C, a sort by template name 886D and a sort by debit account 886E. Each item may be checked or unchecked. Typically checking of only one view by item and one sort by item is permitted.

Typically checking view by template item 486A configures pop-up window 885 to display options for sorting templates as shown in FIG. 8A. Likewise, checking view by group item 886B would display options for sorting groups (not shown).

After one or more item have been checked pop-up window 885 is closed and a sorted list is displayed. Any suitable method may be used to close "pop-up" window 885.

If the view by template item 886A is checked, as shown in FIG. 8A only templates are listed. A sorted template list (not shown) may be similar to the list shown in transactions display window 422 shown in FIG. 4A. If the view by group item 886A is checked, then only groups are listed as shown in the sorted group display window 841. Sorted group display window 841 shown in FIG. 8B and may be reached by following off-page connector K.

Sorted group display window 841 may include initiate tab 894A, a "my transactions" tab 894B and a select button 858E. Initiate tab 894A may appear by default when sorted group display window 841 is opened. Opening initiate tab 894A may display exemplary elements of a list of groups 890A-890C. Each group 890A-890C represents an existing collection of receivers of funds as described above. Opening my transaction tab 894B may be the same as opening my transactions tab 345B.

Exemplary group 890A may include a group name 891. Group name 891 may include a group size 892.

Figure 8B:
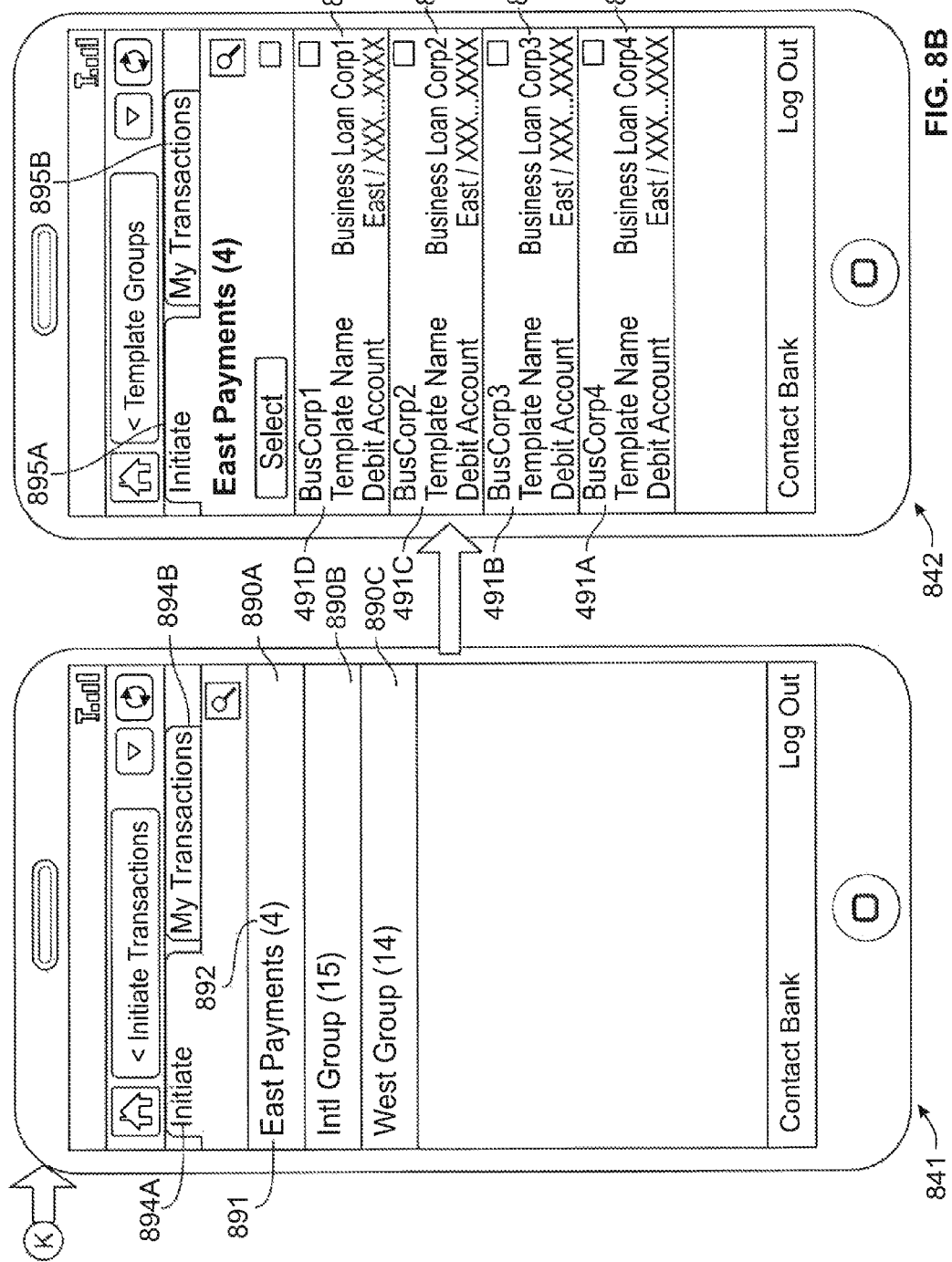
FIG. 8B shows a schematic diagram of an embodiment of a portion of the display windows which access the payment initiation process according to the invention.

Selecting a group—e.g., group 890A may open group details display window 842. Group details display window 842 is shown in FIG. 8B. Group details display window 842 may show initiate tab 895A and a "my transactions" tab 895B. Initiate tab 895A may appear by default when group details display window 842 is opened. Opening initiate tab 895A may display exemplary elements of a list of transactions 893A-893D. Each transaction 893A-893D represents a reviewable transaction which may be submitted or removed from the list. Each transaction 893A-893D may have similar elements as templates 351A-351E shown as part of template display window 422 in FIG. 4A.

In one alternative a user may select transactions (templates) for removal from the group by checking the appropriate checkbox and followed by selecting of select button 858E. In the alternative any suitable method may be used to remove templates from the group. Other suitable methods may be used to add transaction (templates) to the group.

Thus, apparatus and methods that enhance the display of the treasury management functionality for a cash positioning and reporting system are provided.

Persons skilled in the art will appreciate that the present invention can be practiced by other than the described embodiments, which are presented for purposes of illustration rather than of limitation, and that the present invention is limited only by the claims that follow.

What is claimed is:

1. A method for displaying initiation of a transaction on a device wherein the device comprises a display and a processor, the method comprising:
   using the processor to display an initiate transactions template display window showing a portion of a vertically oriented list of templates;
   using the processor to find and select a template from the list of templates;
   using the processor to display a detailed template display window showing at least one detail of the selected template;
   in response to user input, using the processor to convert the detailed template to a reviewable transaction;
   using the processor to display a review/submit display window showing a portion of a vertically oriented list of reviewable transactions;
   in response to user input, using the processor to initiate a reviewable transaction, and
   using the processor to display an initiated transactions display window showing a portion of a vertically oriented list of initiated transaction(s);
   wherein each initiated transaction comprises a timestamp, wherein the timestamp indicates the time when the initiated transaction is valid,
   wherein the list of initiated transactions are reconciled by the processor with a list of submitted but not confirmed transactions,
   wherein the finding and selecting from the list of templates is implemented, at least in part, in response to vertical scrolling among the list of templates,
   wherein the selected template represents a payment template for payment to a trusted receiver of funds.

2. The method of claim 1 wherein the detailed template display window permits a user to enter a value for the at least one detail of the at least one template.

3. The method of claim 1 wherein the detailed template display window permits a user to change a value of the at least one detail of the at least one template.

4. The method of claim 1 wherein the list of initiated transactions is compiled by a server, wherein the server receives confirmation of completion for each transaction on the list of initiated transactions.

5. The method of claim 1 further comprising using the processor to display a pop-up window overlaying the initiate transactions template display window, the pop-up window displaying alternatives for organizing templates into groups.

6. The method of claim 1 further comprising using the processor to display a group details window,
   wherein at least one member of a group can be added or deleted.

7. The method of claim 1 further comprising using the processor to display a totals display window showing a total,
   wherein at least one of the transactions of the list of reviewable transactions comprises a payment value,
   wherein the total is the sum of all of the payments values in the list of reviewable transactions.

8. The method of claim 1 further comprising using the processor to display a submitted group details display window, the initiated group details display window comprising a header section and a tabbed section:
   wherein the header section comprises a group name and the tabbed section displays at least one tab, the tab comprising a list of grouped transactions
   wherein the list of grouped transactions are selected from the list of initiated transactions.

9. A device for displaying approval of a transaction device comprising:
   a display; and
   a processor;
   wherein the processor displays an initiate transactions template display window showing a portion of a vertically oriented list of templates;
   wherein the processor finds and selects a template from the list of templates;
   wherein the processor displays a detailed template display window showing at least one detail of the selected template;
   wherein the processor to converts the detailed template to a reviewable transaction;
   wherein the processor displays a review/submit display window showing a portion of a vertically oriented list of reviewable transactions;
   wherein the processor initiates a reviewable transaction, and wherein the processor displays an initiated transactions display window showing a portion of a vertically oriented list of initiated transactions;

wherein each initiated transaction comprises a timestamp, wherein the timestamp indicates the time when the initiated transaction is valid, wherein the list of initiated transactions are reconciled by the processor with a list of submitted but not confirmed transactions, wherein the finding and selecting from the from the list of templates is via scrolling of the list of templates, wherein the selected template is a payment to a trusted receiver of funds.

10. The device of claim 9 wherein the detailed template display window permits a user to enter a value for the at least one detail of the at least one template.

11. The device of claim 9 wherein the detailed template display window permits a user to change a value of the at least one detail of the at least one template.

12. The device of claim 9 wherein the list of initiated transactions is compiled by a server, wherein the server receives confirmation of completion for each transaction on the list of initiated transactions.

13. The device of claim 9 wherein the processor displays a pop-up window overlaying the initiate transactions template display window, the pop-up window displaying alternatives for organizing templates into groups.

14. The device of claim 9 wherein the processor displays a group details window,
wherein at least one member of a group can be added or deleted.

15. The device of claim 9 wherein the processor displays a totals display window showing a total,
wherein at least one of the transactions of the list of reviewable transactions comprises a payment value,
wherein the total is the sum of all of the payments values in the list of reviewable transactions.

16. The device of claim 9 wherein the processor displays a submitted group details display window, the initiated group details display window comprising a header section and a tabbed section:
wherein the header section comprises a group name and the tabbed section displays at least one tab, the tab comprising a list of grouped transactions,
wherein the list of grouped transactions are selected from the list of initiated transactions.

17. One or more non-transitory computer-readable media storing computer-executable instructions which, when executed by a processor on a computer system, perform a method for a method for displaying approval of a transaction on a device wherein the device comprises a display and a processor, the method comprising:
using the processor to display an initiate transactions template display window showing a portion of a vertically oriented list of templates;
using the processor to find and select a template from the list of templates;
using the processor to display a detailed template display window showing at least one detail of the selected template;
in response to user input, using the processor to convert the detailed template to a reviewable transaction;
using the processor to display a review/submit display window showing a portion of a vertically oriented list of reviewable transactions;
using the processor to initiate a reviewable transaction, and
using the processor to display an initiated transactions display window showing a portion of a vertically oriented list of initiated transactions;
wherein each initiated transaction comprises a timestamp, wherein the timestamp indicates the time when the initiated transaction is valid,
wherein the list of initiated transactions are reconciled by the processor with a list of submitted but not confirmed transactions,
wherein the finding and selecting from the list of templates is implemented, at least in part, in response to vertical scrolling of the list of templates,
wherein the selected template is a payment to a trusted receiver of funds.

18. The media of claim 17 wherein the detailed template display window permits a user to enter a value for the at least one detail of the at least one template.

19. The media of claim 17 wherein the detailed template display window permits a user to change a value of the at least one detail of the at least one template.

20. The media of claim 17 wherein the list of initiated transactions is compiled by a server, wherein the server receives confirmation of completion for each transaction on the list of initiated transactions.

21. The media of claim 17 further comprising using the processor to display a pop-up window overlaying the initiate transactions template display window, the pop-up window displaying alternatives for organizing templates into groups.

22. The media of claim 17 further comprising using the processor to display a group details window,
wherein at least one member of a group can be added or deleted.

23. The media of claim 17 further comprising using the processor to display a totals display window showing a total,
wherein at least one of the transactions of the list of reviewable transactions comprises a payment value,
wherein the total is the sum of all of the payments values in the list of reviewable transactions.

24. The media of claim 17 further comprising using the processor to display a submitted group details display window, the initiated group details display window comprising a header section and a tabbed section:
wherein the header section comprises a group name and the tabbed section displays at least one tab, the tab comprising a list of grouped transactions,
wherein the list of grouped transactions are selected from the list of initiated transactions.

* * * * *